United States Patent
Thorvaldsen et al.

(10) Patent No.: US 10,979,308 B2
(45) Date of Patent: Apr. 13, 2021

(54) SYSTEM ADMINISTRATION

(71) Applicant: Panorama9, Inc., San Francisco, CA (US)

(72) Inventors: Allan Thorvaldsen, San Francisco, CA (US); Diego d'Ambra, San Francisco, CA (US)

(73) Assignee: Panorama9, Inc., San Francisco, CA (US)

( * ) Notice: Subject to any disclaimer, the term of this patent is extended or adjusted under 35 U.S.C. 154(b) by 39 days.

(21) Appl. No.: 16/197,274

(22) Filed: Nov. 20, 2018

(65) Prior Publication Data

US 2019/0089598 A1    Mar. 21, 2019

Related U.S. Application Data

(63) Continuation of application No. 15/602,044, filed on May 22, 2017, now Pat. No. 10,135,694, which is a continuation of application No. 15/001,694, filed on Jan. 20, 2016, now Pat. No. 9,686,144, which is a continuation of application No. 13/831,298, filed on Mar. 14, 2013, now Pat. No. 9,258,206.

(60) Provisional application No. 61/610,944, filed on Mar. 14, 2012.

(51) Int. Cl.
*H04L 12/24* (2006.01)
*H04L 12/26* (2006.01)

(52) U.S. Cl.
CPC ............ *H04L 41/20* (2013.01); *H04L 41/046* (2013.01); *H04L 41/069* (2013.01); *H04L 41/0856* (2013.01); *H04L 41/12* (2013.01); *H04L 41/22* (2013.01); *H04L 43/10* (2013.01); *H05K 999/99* (2013.01); *H04L 41/06* (2013.01)

(58) Field of Classification Search
CPC ..... H04L 41/046; H04L 41/06; H04L 41/069; H04L 41/0856; H04L 41/12; H04L 41/20; H04L 41/22; H05K 999/99
See application file for complete search history.

(56) References Cited

U.S. PATENT DOCUMENTS

| | | | |
|---|---|---|---|
| 5,751,971 A | 5/1998 | Dobbins | |
| 6,085,243 A | 7/2000 | Fletcher | |
| 6,549,932 B1 * | 4/2003 | McNally | G06F 9/4862 709/202 |
| 6,611,863 B1 * | 8/2003 | Banginwar | H04L 41/12 709/203 |
| 6,714,513 B1 * | 3/2004 | Joiner | H04L 41/147 370/224 |
| 7,970,820 B1 * | 6/2011 | Sivasubramanian | H04L 67/06 709/203 |
| 8,533,309 B1 | 9/2013 | Howarth | |

(Continued)

*Primary Examiner* — Chris Parry
*Assistant Examiner* — Dixon F Dabipi
(74) *Attorney, Agent, or Firm* — Ahmann Kloke LLP

(57) ABSTRACT

A technique for improving system administration involves implementing system administration agent programs on a plurality of devices in an administered network. A deployment agent deploys the system administration agent program or a portion thereof to suitable devices when they are detected. System monitoring agents monitor the administered network to generate data. A reporting engine sends agent reports including the generated data to a system administration server. The system administration server facilitates administration of the administered network in real time.

18 Claims, 27 Drawing Sheets

(56) References Cited

U.S. PATENT DOCUMENTS

| | | |
|---|---|---|
| 8,543,741 B2 | 9/2013 | Reynolds |
| 8,555,273 B1 * | 10/2013 | Chia ................... G06F 8/654 |
| | | 717/173 |
| 2004/0177143 A1 * | 9/2004 | Maciel ............... H04L 41/22 |
| | | 709/224 |
| 2005/0169185 A1 * | 8/2005 | Qiu ................... H04L 41/145 |
| | | 370/241 |
| 2006/0092861 A1 | 5/2006 | Corday |
| 2006/0248522 A1 * | 11/2006 | Lakshminarayanan ... G06F 8/61 |
| | | 717/174 |
| 2009/0049207 A1 * | 2/2009 | Reynolds .......... H04L 12/40013 |
| | | 710/16 |
| 2012/0317491 A1 | 12/2012 | Wong |
| 2013/0003735 A1 * | 1/2013 | Chao ................... H04L 45/66 |
| | | 370/392 |
| 2014/0032753 A1 * | 1/2014 | Watanabe ......... H04L 29/08549 |
| | | 709/224 |
| 2014/0143695 A1 | 5/2014 | Sundermeyer |
| 2014/0204750 A1 | 7/2014 | Salter |
| 2014/0222989 A1 | 8/2014 | Tanaka |

* cited by examiner

| Dashboard | Issues | Assets | Reports | Network map |
| Devices | Users | Software | | |

| Software name | version | Installations | Licenses | License Type |
|---|---|---|---|---|
| * 32 Bit HP CIO Components Installer | 4.1.1 | 1 | 4 | Unknown |
| * 3Connect | 2.0.1 | 1 | 0 | Unknown |
| * AccelerometerP11 | 2.00.10.70 | 1 | 34 | Free |
| * Acrobat.com | 0.0.0 | 1 | 0 | Unknown |
| * Acrobat.com | 1.2.443 | 1 | 0 | Unknown |
| * Adobe Acrobat 9 Pro-English, Francais, Deutsch 9.0.0 | | 1 | 0 | Unknown |
| * Adobe After Effects CS4 | 9 | 1 | 0 | Unknown |
| * Adobe After Effects CS4 Presets | 9 | 1 | 0 | Unknown |
| * Adobe After Effects CS4 Third Party Content | 9 | 1 | 0 | Unknown |
| * Adobe AIR | 3.1.0.4880 | 1 | 0 | Unknown |
| * Adobe AIR | 1.1.0.5790 | 1 | 0 | Unknown |
| * Adobe Anchor Service CS4 | 2.0 | 1 | 0 | Unknown |
| * Adobe Asset Services CS4 | 4 | 1 | 0 | Unknown |
| * Adobe Bridge CS4 | 3 | 1 | 0 | Unknown |
| * Adobe CMaps CS4 | 2.0 | 1 | 0 | Unknown |
| * Adobe Color - Photoshop Specific CS4 | 2.0 | 1 | 0 | Unknown |
| * Adobe Color EU Recommend Settings CS4 | 2.0 | 1 | 0 | Unknown |
| * Adobe Color JA Extra Settings CS4 | 2.0 | 1 | 0 | Unknown |
| * Adobe Color NA Extra Settings CS3 | 2.0 | 1 | 0 | Unknown |
| * Adobe Color Video Profiles AE CS4 | 2.0 | 1 | 0 | Unknown |

253 Items  Page 1 / 13  Prev. 1 2 3 4 5 6 Next. Prev. Last

SYSTEM ADMINISTRATION

CROSS-REFERENCE TO RELATED APPLICATIONS

This application is a continuation of U.S. patent application Ser. No. 15/602,044, filed May 22, 2017, which is a continuation of U.S. patent application Ser. No. 15/001,694, filed Jan. 20, 2016, now U.S. Pat. No. 9,686,144, which is a continuation of U.S. patent application Ser. No. 13/831,298, filed Mar. 14, 2013, now U.S. Pat. No. 9,258,206, which claims priority to U.S. Provisional Patent Application Ser. No. 61/610,944, filed Mar. 14, 2012, all of which are incorporated by reference herein.

BACKGROUND

System administrators maintain and operate a computer system and/or network. The duties of a system administrator are difficult to characterize in a comprehensive, global fashion due to the large number of tasks and responsibilities that system administrators perform. Typically, system administrators might be responsible for installing, supporting, and maintaining servers or other computer systems, and planning for and responding to problems in the network. Problem-solving is something of an art in the field, and a good system administrator is generally good at problem-solving.

Improving the tools available to system administrator is an ongoing endeavor. It is desirable to get data associated with backups, updates, patches, configuration changes, installation and configuration of hardware and software, updating user accounts, and network data (links, machines up and running, etc.) to a system administrator to enable to system administrators to better do their jobs. If data is not readily available, system administrators can be less effective.

The foregoing examples of the related art and limitations related therewith are intended to be illustrative and not exclusive. Other limitations of the related art will become apparent upon a reading of the specification and a study of the drawings.

SUMMARY

In various examples, one or more of the above-described problems have been reduced or eliminated, while other examples are directed to other improvements. The following examples and aspects thereof are described and illustrated in conjunction with systems, tools, and methods that are meant to be exemplary and illustrative, not limiting in scope.

A technique for improving system administration involves implementing system administration agent programs on a plurality of devices in an administered network. A deployment agent deploys the system administration agent program or a portion thereof to suitable devices when they are detected. System monitoring agents monitor the administered network to generate data. A reporting engine sends agent reports including the generated data to a system administration server. The system administration server facilitates administration of the administered network in real time.

BRIEF DESCRIPTION OF THE DRAWINGS

FIG. 5 depicts a portion of a screenshot 500 with a dashboard "splash page" at which a system administrator will normally start when logging in to an account associated with an administered network.

FIG. 6 depicts a portion of a screenshot 600 for displaying issues.

FIG. 7 depicts a portion of a screenshot 700 for displaying issues settings.

FIG. 10 depicts a portion of a screenshot 1000 for displaying availability settings.

FIG. 11 depicts a portion of a screenshot 1100 for displaying availability notifications.

FIG. 12 depicts a portion of a screenshot 1200 for displaying compliance.

FIG. 13 depicts a portion of a screenshot 1300 for displaying compliance settings.

FIG. 15 depicts a portion of a screenshot 1500 for displaying assets.

FIG. 16 depicts a portion of a screenshot 1600 for displaying assets.

FIG. 17 depicts a portion of a screenshot 1700 for displaying assets.

Figure 23:
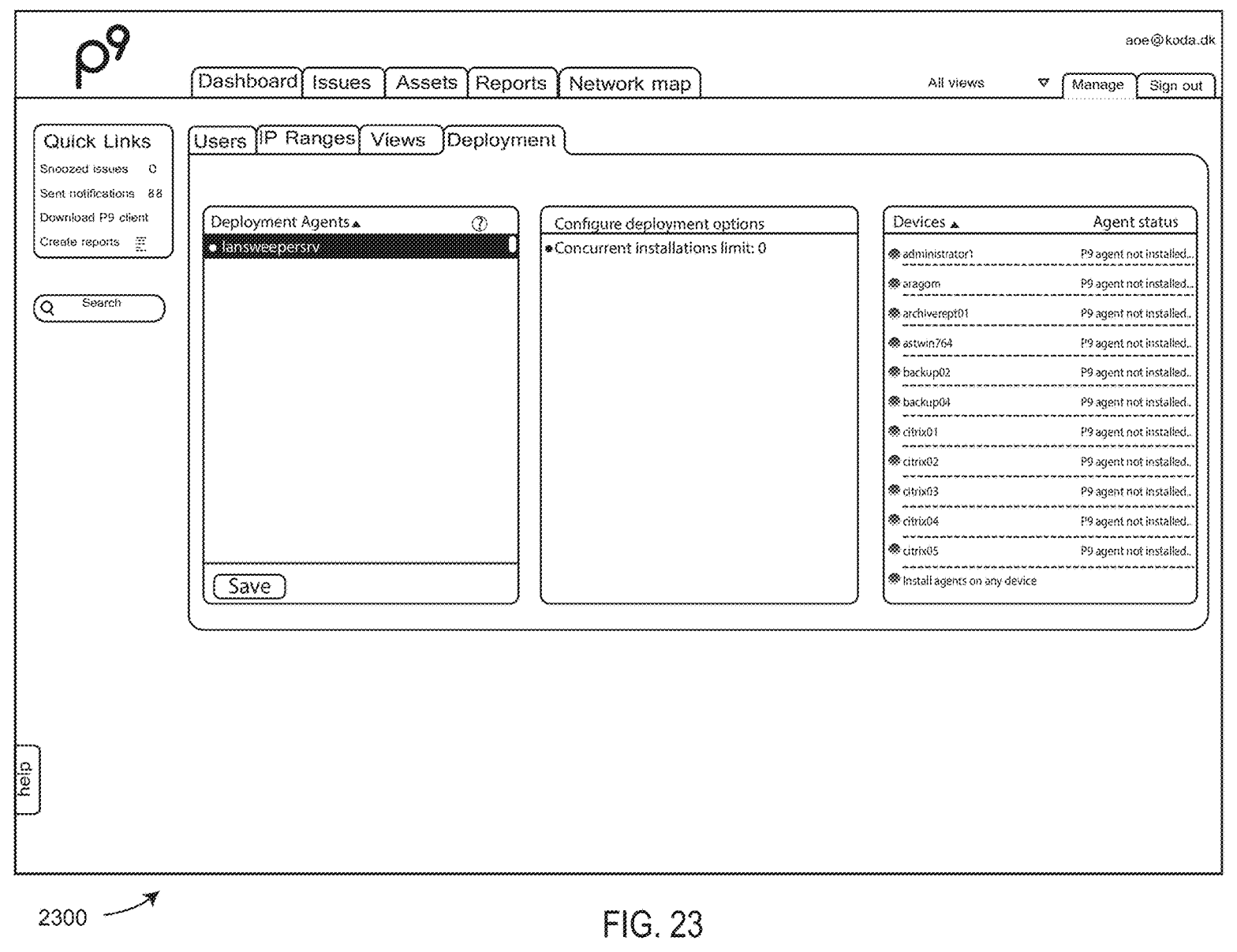

FIG. 23 depicts another portion of a screenshot 2300 for managing users, IP ranges, views, and deployment.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
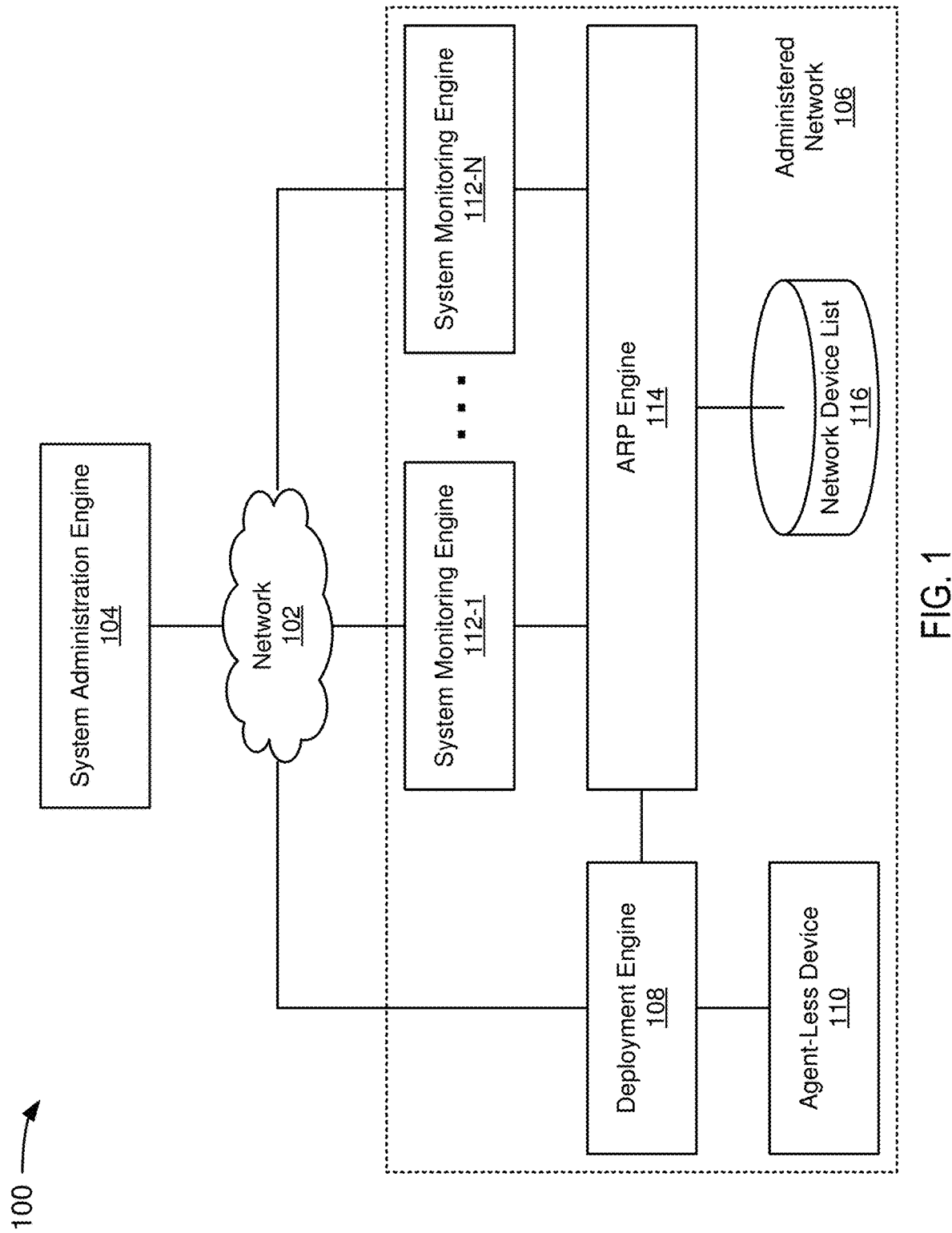
FIG. 1 depicts an example of a network with a real-time system administration system.

FIG. 1 depicts an example of a system 100 with a real-time system administration ("sys admin") system. The system 100 includes a network 102, a system administration engine 104 coupled to the network 102, and an administered network 106 coupled to the network 102. In the example of FIG. 1, the network 102 can include a networked system that includes several computer systems coupled together, such as a local area network (LAN), the Internet, or some other networked system. The term "Internet" as used in this paper refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. Applicable known or convenient physical connections of the Internet and the protocols and communication procedures of the Internet and the web are and/or can be used. The network 102 can broadly include, as understood from relevant context, anything from a minimalist coupling of the components illustrated in the example of FIG. 1, to every component of the Internet and networks coupled to the Internet. However, components that are outside of the control of the actionable alert system 106 can be considered sources of data received in an applicable known or convenient manner.

In the example of FIG. 1, the system administrator engine 104 can be implemented on one or more computer systems coupled to the network 102. For example, the system administrator engine 104 can be implemented on a server, "in the cloud," or in some other convenient and applicable manner. A computer system will usually include a processor, memory, non-volatile storage, and an interface. Peripheral devices can also be considered part of the computer system. A typical computer system will include at least a processor, memory, and a device (e.g., a bus) coupling the memory to the processor. The processor can include, for example, a general-purpose central processing unit (CPU), such as a microprocessor, or a special-purpose processor, such as a microcontroller. The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory.

The bus can couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to one or more interfaces. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

In the example of FIG. 1, the administered network 106 is under the control of a person, a group of people, a legal entity, or some other party. Networks can include enterprise private networks and virtual private networks (collectively, private networks), which are well known to those of skill in computer networks. As the name suggests, private networks are under the control of an entity rather than being open to the public. Private networks can include a head office and optional regional offices (collectively, offices). Many offices enable remote users to connect to the private network offices via some other network, such as the Internet. It may be desirable for some or all of the components of the administered network 106 to be implemented on a private network.

The administered network 106 can include an applicable network interface (not shown) coupled to one or more component devices and the network 102. The network interface can include multiple distinct network interfaces, which may be treated as a single network interface for the administered network 106 for illustrative convenience. Communication channels by which the system administration system 104 and the administered network 106 (or devices therein) are operationally connected are treated as passing through the network interface, even if certain communication channels are through different hardware ports. That is, the network interface can comprise multiple different interfaces.

In the example of FIG. 1, the administered network 106 includes a deployment engine 108, an agent-less machine 110 coupled to the deployment engine 108, system monitoring engines 112-1 to 112-N (collectively, system monitoring engines 112), an address resolution protocol (ARP) engine 114 coupled to the deployment engine 108 and the system monitoring engines 112, and a network device list datastore 116 coupled to the ARP engine 114. The deployment engine 108 may or may not be implemented in a distributed fashion across machines that respectively implement the system monitoring engines 112.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The deployment engine 108 is configured to deploy system monitoring agents to devices in the administered network 106. In order to implement the deployment engine 108 in the administered network 106, a program can be downloaded from a server (not shown), loaded from a memory device (e.g., compact disk (CD), flash memory device, floppy disk, etc.), or provided to a suitable machine in some other manner that makes a system administrator agent available on the administered network 106. A purpose of the deployment engine 108 is to provide system administrator agent programs to suitable devices, such as, provided by way of example but not limitation, the agent-less device 110. For illustrative purposes, the agent-less device 110 is a device suitable for implementation of a system administrator agent program (see, e.g., system monitoring engines 112, below) that has the system administrator agent program installed thereon.

It may be desirable to implement the deployment engine 108 on a server to ensure that the deployment engine 108 will not go away (e.g., it is turned off, carried home by an employee, etc.). Because servers tend to be always-on and are generally not implemented in laptop computers that are sometimes taken home by employees, a server is a good choice for implementing the deployment engine 108. However, any applicable device can implement the deployment engine 108 (even a portable device).

The system monitoring engines 112 have a system administrator agent program installed. The system administrator agent program may or may not be the same as the system administrator agent program installed on the deployment engine 108. For example, the deployment engine 108 and the system monitoring engines 112 can, e.g., download the same system administrator agent program and the program on the deployment engine 108 can be configured to deploy the system administrator agent program to other devices, such as the agent-less device 110, while the system monitoring engines 112 can be configured to monitor the administered network 106 (and perhaps other networks, as well). The system administrator agent program on a device that includes at least a portion of the deployment engine 108 may or may not also be configured to perform system monitoring. In other words, a system administrator agent program can be configured to perform the dual roles of deployment and system monitoring. For illustrative convenience, the deployment engine 108 is generally referenced in this paper as a distinct engine relative to the system monitoring engines 112.

In the example of FIG. 1, the system monitoring engines 112 are coupled to the ARP engine 114, which is coupled to the network device list datastore 116. The ARP engine 114 can collect data from one or more devices in the administered network 106 and store network device information in the network device list datastore 116. When the system monitoring engines 112 are to provide a list of devices to the system administrator engine 104, the ARP engine 114 can access the relevant data in the network device list datastore 116 and provide the relevant data to the system monitoring engines 112 sufficient to respond to a request for a device list. It is also possible for the ARP engine 114 to be queried and respond directly. In a Windows implementation, the ARP engine 114 can be implemented as a domain controller. In some implementations, the ARP engine 114 includes an optional operating system API through which a device list can be requested and provided.

In the example of FIG. 1, in operation, the deployment engine 108 asks the ARP engine 114 for a list of machines in the administered network 106. The ARP engine 114 can access the network device list datastore 116 to obtain the list. When the list is provided by the ARP engine 114 to the deployment engine 108, the deployment engine 108 sends the list to the system administrator engine 104. The system administrator engine 104 instructs the deployment engine 108 regarding onto which machines to install the system administrator agent program (e.g., to create system monitoring engines 112 thereon). When devices are added to or removed from the administered network 106, the ARP engine 114 can detect the changes and update the network device list datastore 116 accordingly. If an added device already has the system administrator agent program installed, the deployment engine 108 can configure the agent (or the agent can self-configure, depending upon the implementation and/or configuration of the system).

Advantageously, the system 100 enables real-time administration of the administered network 106, including, as will be discussed below, tools that take advantage of the real-time nature of the monitoring and deployment. Because the system administrator engine 104 can be implemented in the cloud (or at least outside of the administered network 106), administrative tasks can be carried out through a browser-based device anywhere, anytime. The system 100 is auto-configuring because the deployment engine 108 can receive reports from system monitoring engines 112, including, for example, data sufficient to determine that the agent-less device 110 does not have an agent installed. The deployment engine 108 can then push the agent to the agent-less device 110 (and any other device that is determined to not yet have an agent).

Figure 2:
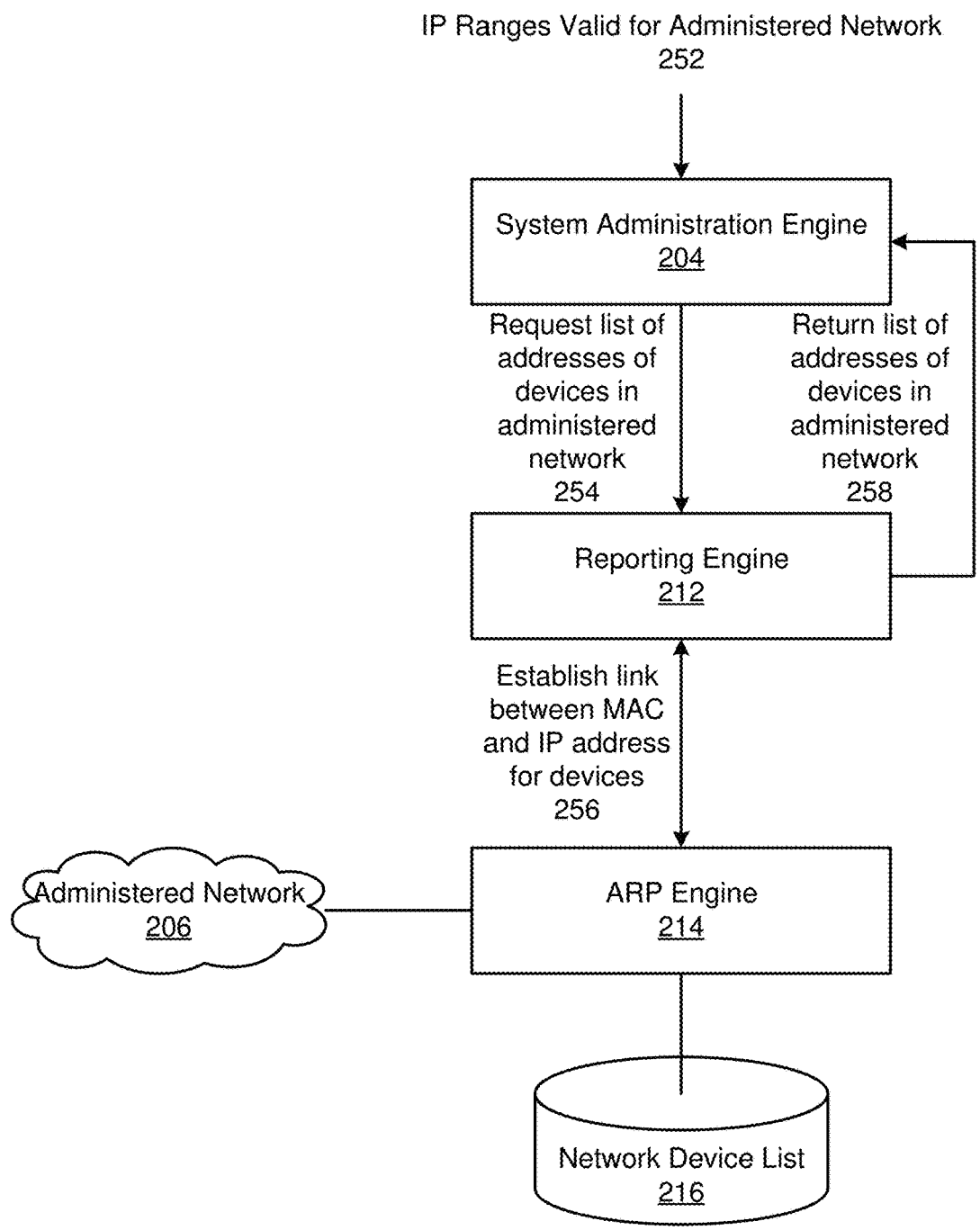
FIG. 2 depicts an example of a system for determining device addresses on an administered network.

FIG. 2 depicts an example of a system 200 for determining device addresses on an administered network. The system 200 includes a system administration engine 204, a reporting engine 212 coupled to the system administration engine 204, an ARP engine 214 coupled to the reporting engine 212, an administered network 206 coupled to the ARP engine 214, and a network device list datastore 216 coupled to the ARP engine 214. In operation, the system administration engine 204 receives input 252 from, e.g., an administrator. The input 252 includes internet protocol (IP) address ranges that are valid for the administered network 206. Determining the valid range of IP addresses can be in accordance with known or convenient techniques. The reporting engine 212 can be implemented on any applicable device on which a system administration agent program is installed (e.g., a device with a system monitoring engine, a deployment engine, etc.).

In the example of FIG. 2, the system administration engine 204 sends a request message 254 to the reporting engine 212. The request message 254 includes a request for a list of addresses of devices in the administered network 206. It should be noted that the reporting engine 212, the ARP engine 214, and/or the network device list datastore 216 can be implemented on devices that are "on" the administered network 206, and are depicted outside of the administered network 206 for illustrative purposes only.

In the example of FIG. 2, the reporting engine 212 communicates with the ARP engine 214, which is coupled to the administered network 206 (or on the administered network 206, as already noted) and the network device list 216. In a typical implementation, the ARP engine 214 can continuously obtain data from the administered network 206 to populate the network device list 216. Thus, when the reporting engine 212 communicates with the ARP engine 214 on behalf of the system administration engine 204, the ARP engine 214 can provide data 256 (e.g., in the form of a list of IP addresses and MAC addresses) sufficient to establish a link between MAC and IP addresses for devices in the administered network 206.

In the example of FIG. 2, the reporting engine 212 sends a response 258 to the system administration engine 204. The response 258 includes a list of addresses of devices in the administered network 206. The list of addresses may or may not identify peripheral devices. Preferably, the list of addresses will identify devices that are capable of accessing shared resources of the administered network 206.

Devices that are found and reported to the system administration engine 204 can be referred to as "blind-spotted" devices. Advantageously, the system 200 can operate in real-time, blind-spotting devices as they are added to the administered network 206. Where the system administration engine 204 is appropriately located, the device data can be displayed anywhere, anytime.

Figure 3:
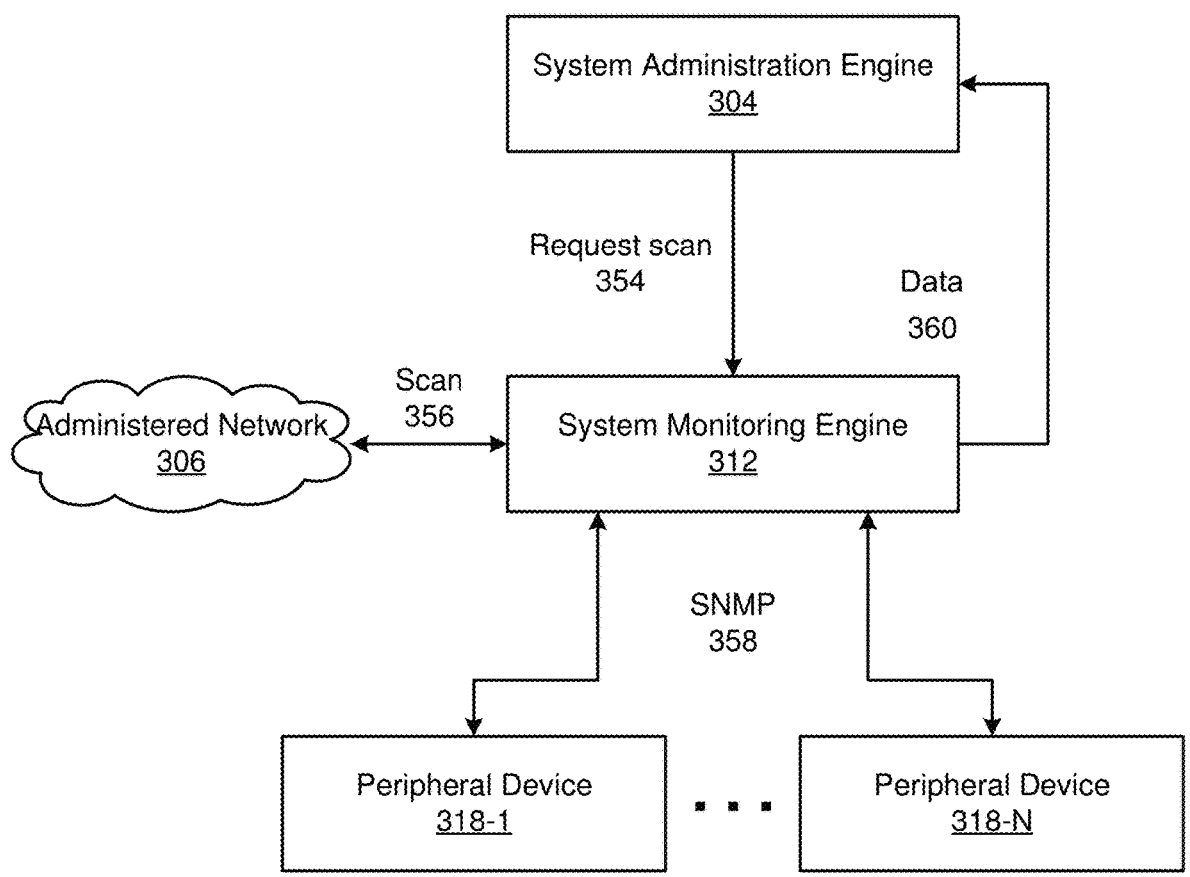
FIG. 3 depicts an example of a system for obtaining peripheral device data.

FIG. 3 depicts an example of a system 300 for obtaining peripheral device data. The system 300 includes a system administration engine 304, a system monitoring engine 312 coupled to the system administration engine 304, an administered network 306 coupled to the system monitoring engine 312, and peripheral devices 318-1 to 318-N (referred to collectively as peripheral devices 318) coupled to the system monitoring engine 312.

In the example of FIG. 3, the system administration engine 304 sends a request message 354 for a scan of devices detectable by the system monitoring engine 312. It may be noted that the system administration engine 304 may or may not actually send the request message 354 because it is possible to configure the system monitoring engine 312 to perform scans on a periodic or an as-needed basis. The system monitoring engine 312 can perform a scan 356 of the administered network 306 to establish a link between MAC and IP addresses (see, e.g., FIG. 2).

In the example of FIG. 3, the system monitoring engine 312 is coupled to the peripheral devices 318. In addition to data about devices on the network, the system monitoring engine 312 can use SNMP 358 to obtain information about peripheral devices 318. In some cases, one or more of the peripheral devices 318 may be suitable for having a system administrator agent program installed on them. In other cases, one or more of the peripheral devices 318 may not be suitable or appropriate. For example, if a desktop computer has a dedicated printer operationally connected to it, it may be desirable to enable the system administrator to see the dedicated printer, but it may not be necessary for the dedicated printer to act as a reporting engine, system monitoring engine, or deployment engine, making installation of a system administrator agent program at least unnecessary.

The amount and type of data that a peripheral device provides via SNMP can depend upon the device, manufacturer, and other factors. For example, a printer may or may not communicate data regarding consumables (toner, paper, spare parts, etc.) and other vendor-specific data sets. The data 360 can be presented in an overview or other format for all desired peripheral devices coupled to devices having a system administration agent program installed thereon. While there is theoretically no limit to the amount of drill-down into peripheral devices that can be done, there may be a practical limitation based upon the utility of the information. For example, every computer is a combination of components, whether clearly peripheral because attached with a cable, inserted into a slot within the chassis, or even welded onto a PCB, and it is possible to report on the various components with as much detail as may be desired. It follows that, depending upon the implementation and/or capabilities of the system 300, an agent machine may or may not detect dedicated peripherals for reporting to the system administration engine 304.

In a specific implementation, some peripheral devices can download a system administration agent program. This gives the peripheral device a common interface with the system administration engine 304, enables real-time (push)

notifications of activities at the peripheral device, enables the device itself to take on reporting functions (push), and puts the interface under the control of the system administrator. It also can facilitate compliance through deep package inspection at the peripheral device, or redundant deep package inspection at the peripheral device that can be compared to other measurements elsewhere in the administered network 306. It is possible to enforce uniform policy implementation through a dashboard of the system administration engine 304 per user or per device.

Figure 4:
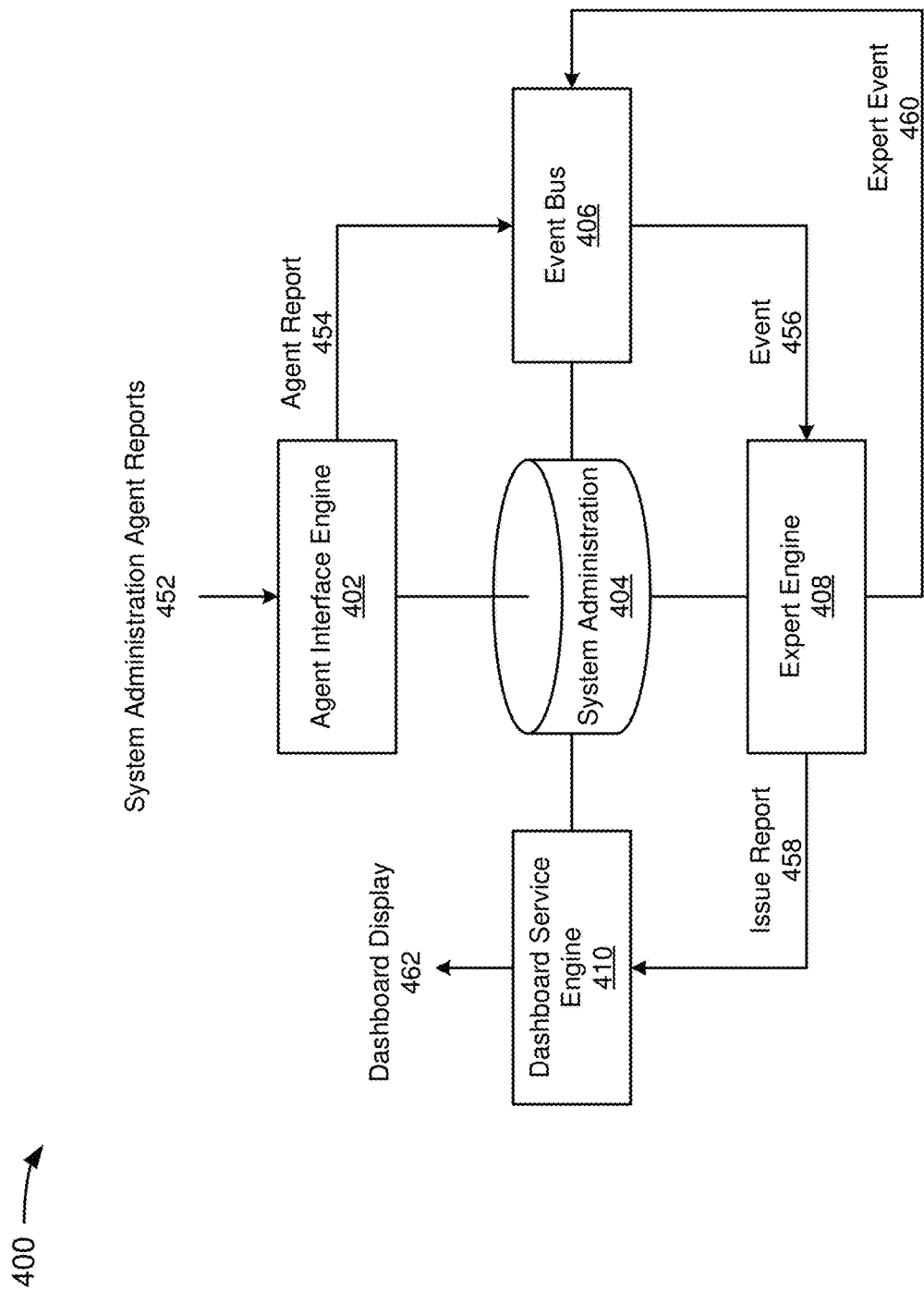
FIG. 4 depicts an example of a system administration engine server system.

FIG. 4 depicts an example of a system administration engine server system 400. The system 400 includes an agent interface engine 402, a system administration datastore 404 coupled to the agent interface engine 402, an event bus 406 coupled to the agent interface engine 402 and the system administration datastore 404, an expert engine 408 coupled to the event bus 406 and the system administration datastore 404, and a dashboard service engine 410 coupled to the expert engine 408 and the system administration datastore 404.

In the example of FIG. 4, the agent interface engine 402 receives input (e.g., agent reports) from a system administration agent (e.g., a reporting agent) from within an administered network. Where the system 400 serves multiple customers, the data from different networks will, naturally, have to be kept separate (and presumably confidential). However, analytics can be derived from multiple separate networks and used for improving the expert engine 408, reports, or other purposes.

In the example of FIG. 4, the system administration datastore 404 stores data associated with an agent report. Other engines, such as the expert engine 408 can manipulate the data (e.g., delete irrelevant, redundant, or old data, or form associations between first and second agent reports). In a specific implementation, the agent interface engine 402 stores data associated with an agent report in the system administration engine 404.

In the example of FIG. 4, the event bus 406 is coupled to the agent interface engine 402. An agent report 454 is passed from the agent interface engine 402 to the event bus 406. The event bus 406 can be implemented in a number of ways, including as mongoDB, which is in the noSQL family of datastores, in the system administration datastore 404, or in other ways. In an alternative, the agent report 454 could be stored in the system administration datastore 404, and the event bus 406 could access the agent report 454 from the system administration datastore 404 (or the event bus 406 could be bypassed and the expert engine 408 could access the agent report from the system administration datastore 404). In any case, at least conceptually, an agent report acts as, is translated into, or provides some data that becomes part of an event for consideration by the system 400.

In the example of FIG. 4, the expert engine 408 collects information about assets of the administered network from the system administration datastore 404, considers an event 456 from the event bus 406, and determines whether an issue report 458 is merited. The expert engine 408 can include multiple expert subsystems in multiple areas. Expert subsystems can include, for example, an anti-virus expert to determine whether a device can subscribe to an anti-virus service, an update expert to decide whether to update a browser to a new version, a firewall expert to decide whether a firewall is blocking traffic that should be allowed, a peripheral device expert to determine whether a user has been consuming too much paper on a printer, a services issue to determine whether a service is up or down and whether to alert a sys admin, a blind-spotter expert to determine whether a new device has joined the administered network, a data calculation expert to calculate usage patterns to predict issues such as running out of resources, a heartbeat expert to determine whether a device heartbeat is within acceptable parameters, an Internet service expert to ensure SMTP is working properly, a network expert to determine whether traffic is going where it is not supposed to go, a patch expert to determine whether a patch has been or should be applied, a user expert to determine if a user is acting within acceptable parameters, an alert expert that can pick up an expert event 460 placed on the event bus 406 by another expert, to name several. In a specific implementation, each of the expert subsystems is implemented as an engine, the combination of which can be characterized as the expert engine 408.

In the example of FIG. 4, the dashboard service engine receives the issue report 458 from the expert engine 408 and incorporates the issue report 458 into a relevant portion of a system administrator dashboard display. The dashboard display 462 can be sent to a system administrator client for presentation through, e.g., a browser. The dashboard display 462 can also be sent to relevant parties, such as an emergency alert service responsible for alerting sys admins when there is a problem with a network or components thereof.

Advantageously, the system 400 can operate in real time by receiving and processing agent reports and making the data available to a system administrator immediately (if the appropriate window is open) or on demand. The system 400 enables the sys admin to monitor network devices from a central location. The dashboard can be displayed anywhere, anytime.

FIGS. 5-23 are screenshots of a specific implementation of the dashboard mentioned in the previous paragraphs. The dashboard can be implemented as an engine. In the specific example of FIGS. 5-23, the engine displays information in a browser, from which the screenshots were taken. It should be noted the screenshots illustrate a dashboard that was developed as a proof of concept and prototype. The system has since evolved and it should be understood that there were other ways to implement the techniques described in this paper that were not limited to the examples provided.

Figure 5:
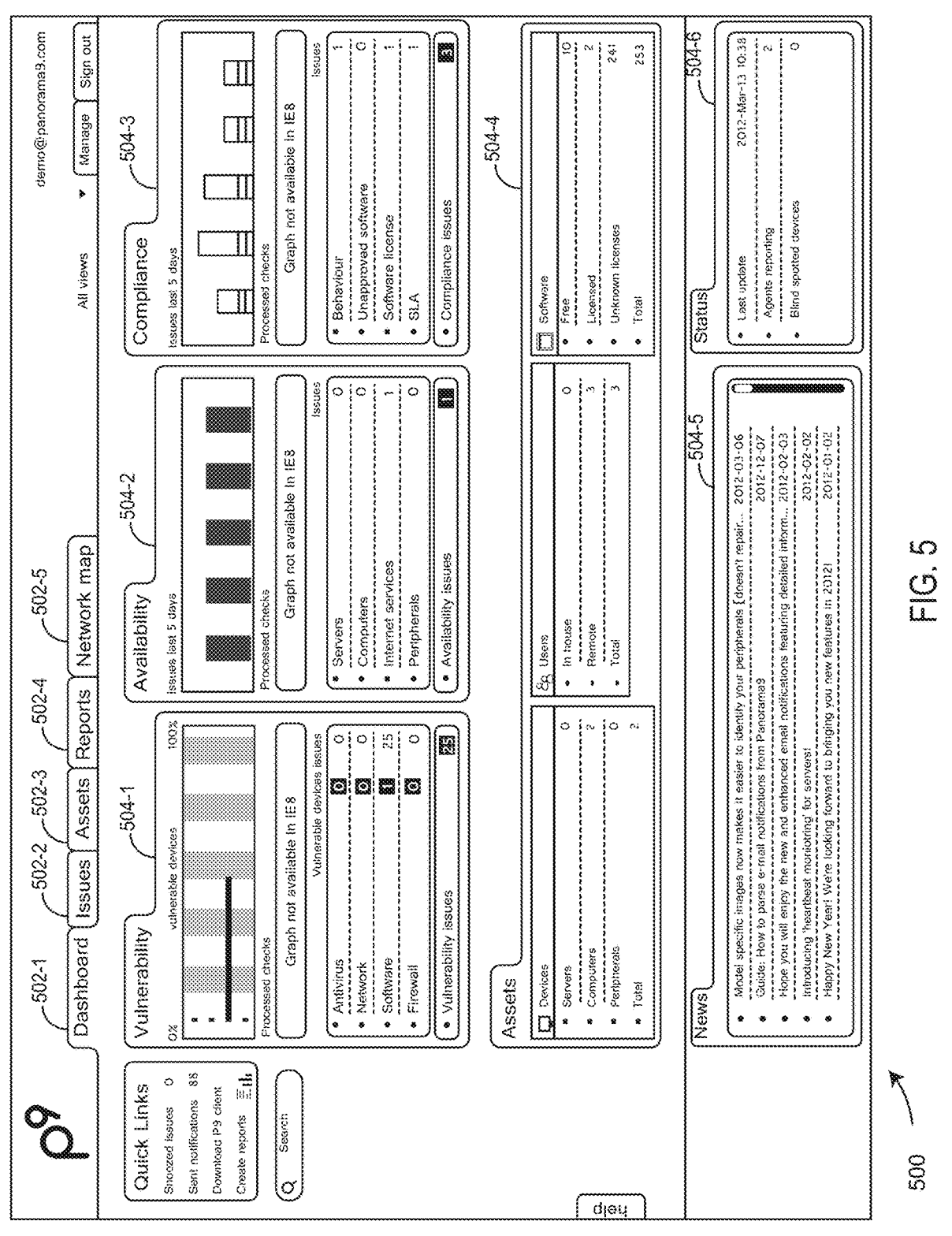

FIG. 5 depicts a portion of a screenshot 500 with a dashboard "splash page" at which a system administrator will normally start when logging in to an account associated with an administered network. In the example of FIG. 5, there are five menu tabs 502-1 to 502-5 (referred to collectively as the menu tabs 502). The dashboard menu tab 502-1 is selected in the example of FIG. 5.

In the example of FIG. 5, there are six dashboard display items 504-1 to 504-6 (referred to collectively as the dashboard display items 504). The vulnerability dashboard display item 504-1 includes device vulnerabilities categorized by antivirus, network, software, and firewall. In the example of FIG. 5, there is one vulnerable device with 25 software vulnerability issues. Clicking on a portion of the vulnerability dashboard display item 504-1, in the specific implementation from which the screenshot 500 was snapped, takes the system administrator to issues→vulnerabilities (see, e.g., FIG. 6). It is also possible to reach issues→vulnerabilities by clicking on the issues menu tab 502-2. Also, in the specific implementation from which the screenshot was snapped, clicking on a category (e.g., software in the vulnerability dashboard display item 504-1) can enable the system administrator to reach issues→vulnerability after filtering for the category that was clicked. In the example of FIG. 5, clicking software would have no effect because the only vulnerability issues in this example are software. However, clicking on software license under compliance would filter the compliance issues to one (the software license issue).

The availability dashboard display item 504-2 includes device availability categorized by servers, computers, Internet services, and peripherals. In the example of FIG. 5, there is one Internet services availability issue. Clicking on a portion of the availability dashboard display item 504-2, in the specific implementation from which the screenshot 500 was snapped, takes the system administrator to issues→availability (see, e.g., FIG. 9). It is also possible to reach issues→availability by clicking on the issues menu tab 502-2.

The compliance dashboard display item 504-3 includes device compliance categorized by behavior, unapproved software, software license, and SLA. In the example of FIG. 5, there is one behavior compliance issue, one software license issue, and one SLA issue. Clicking on a portion of the compliance dashboard display item 504-3, in the specific implementation from which the screenshot 500 was snapped, takes the system administrator to issues→compliance (see, e.g., FIG. 12). It is also possible to reach issues-→compliance by clicking on the issues menu tab 502-2.

The assets dashboard display item 504-4 includes assets categorized by devices, users, and software. In the example of FIG. 5, there are two device assets, three user assets, and 253 software assets. Clicking on a portion of the assets dashboard display item 504-4, in the specific implementation from which the screenshot 500 was snapped, takes the system administrator to assets→device (see, e.g., FIG. 15). It is also possible to reach assets→devices by clicking on the assets menu tab 502-3. By clicking on the users asset category the system administrator can go to assets→users directly. By clicking on the software asset category the system administrator can go to assets→software directly. Also, in the specific implementation from which the screenshot was snapped, clicking on a subcategory (e.g., licensed under the software category) can enable the system administrator to reach assets→software after filtering for the subcategory that was clicked.

The news dashboard display item 504-5 includes a news feed.

The status dashboard display item 504-6 includes administered network status including a last update by timestamp, number of agents reporting, and number of blind spotted devices.

Figure 6:
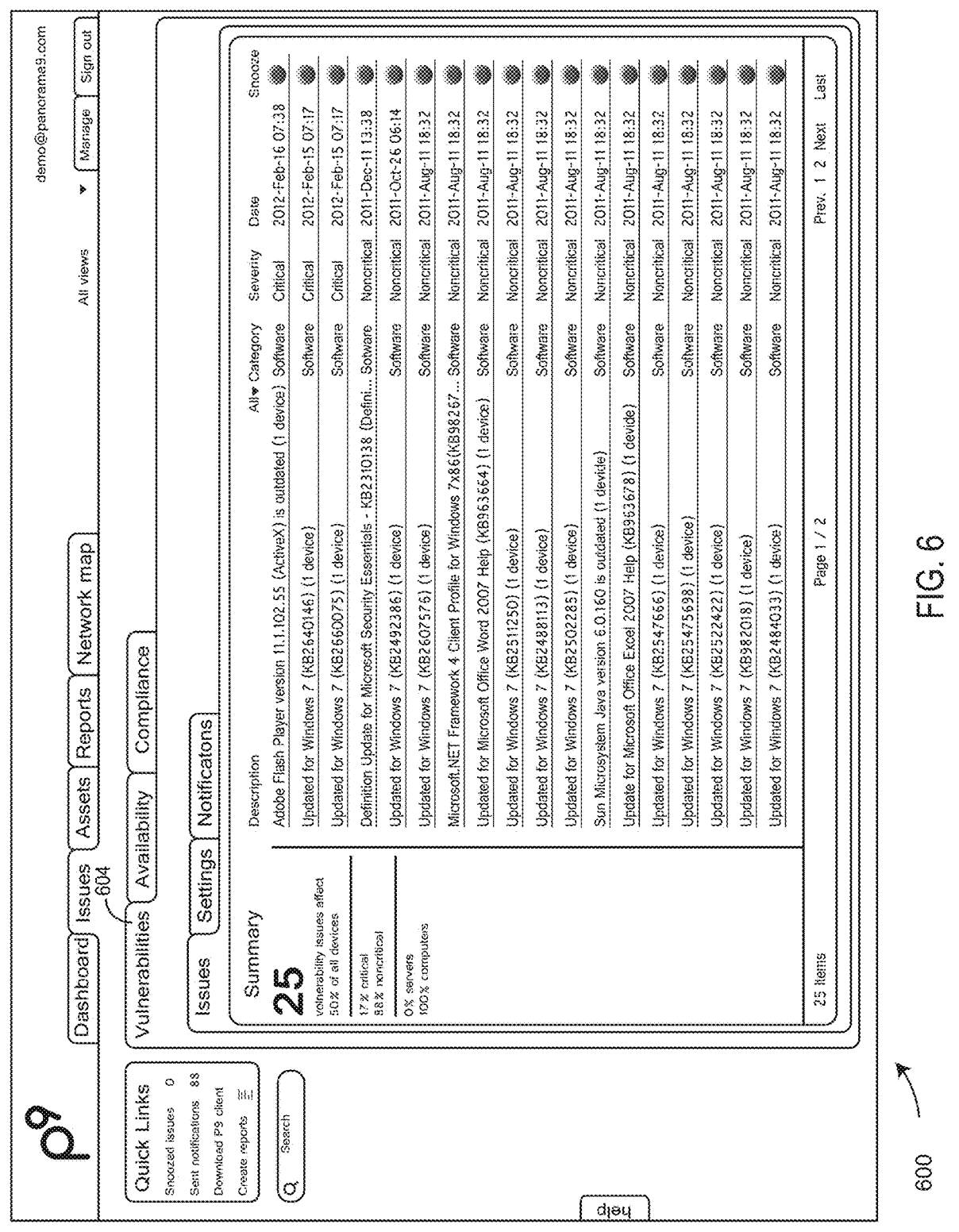

FIG. 6 depicts a portion of a screenshot 600 for displaying issues. The vulnerabilities tab 604 has three sub-tabs, issues, settings, and notifications. The contents of the issues sub-tab are illustrated in the example of FIG. 6. The issues have a category (see, e.g., FIG. 5), a severity, a date, and a button to snooze each issue. A system administrator can conveniently view the list of issues, including, for example, issues related to having an older version of software installed or available updates for software. The system administrator can resolve the issue or snooze it. Clicking on the issue or on the [1 device] links give additional information about the issue or device(s) having the issue. Clicking on the snooze button can allow the system administrator to snooze the issue for a period of time (e.g., day, week, month, etc.).

Figure 7:
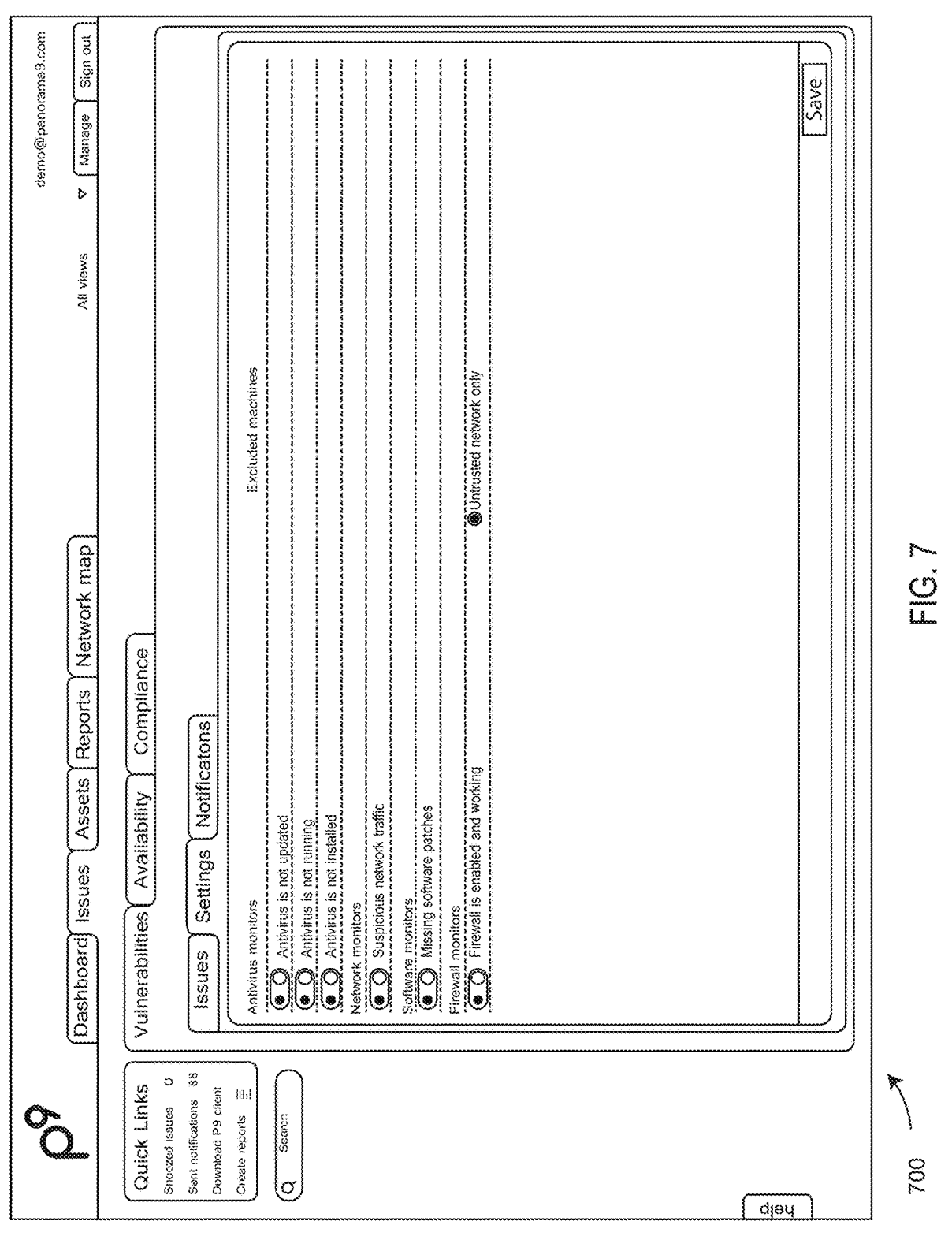

FIG. 7 depicts a portion of a screenshot 700 for displaying issues settings. The complexity of the monitors is implementation- and/or configuration-specific. For example, there is no particular reason the issues must all be controlled with a toggle (as illustrated in the example of FIG. 7) and could instead be implemented with other controls (e.g., a slider).

Figure 8:
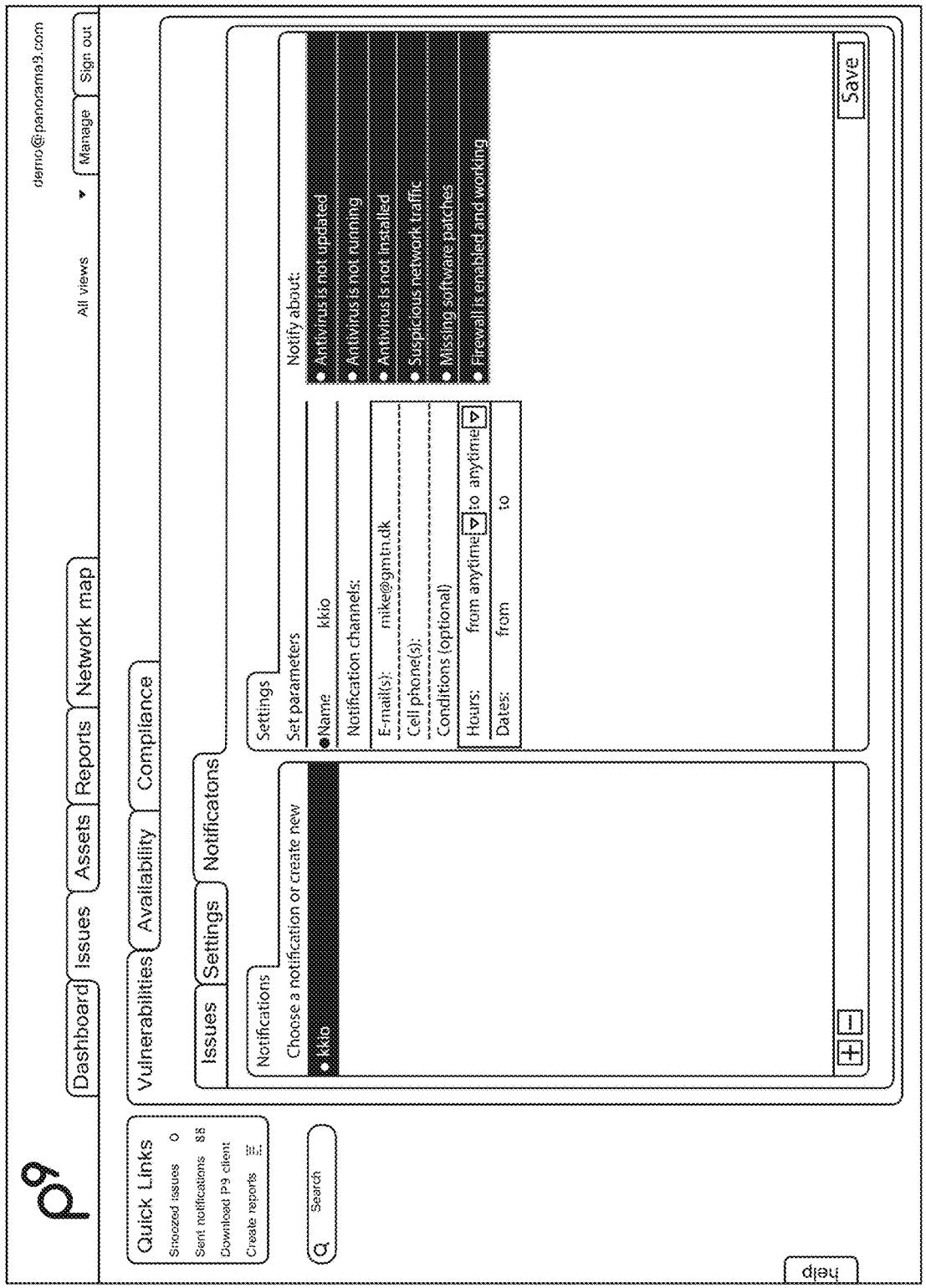
FIG. 8 depicts a portion of a screenshot 800 for displaying issues notifications.

FIG. 8 depicts a portion of a screenshot 800 for displaying issues notifications. The notification channel (e.g., email, cell phone, etc.) and conditions can be set as appropriate. Advantageously, because the system can provide real-time analysis of the network, a system administrator or other party can detect unapproved activity (e.g., installation of a forbidden software product) as it happens and stop the installation remotely or automatically.

Figure 9:
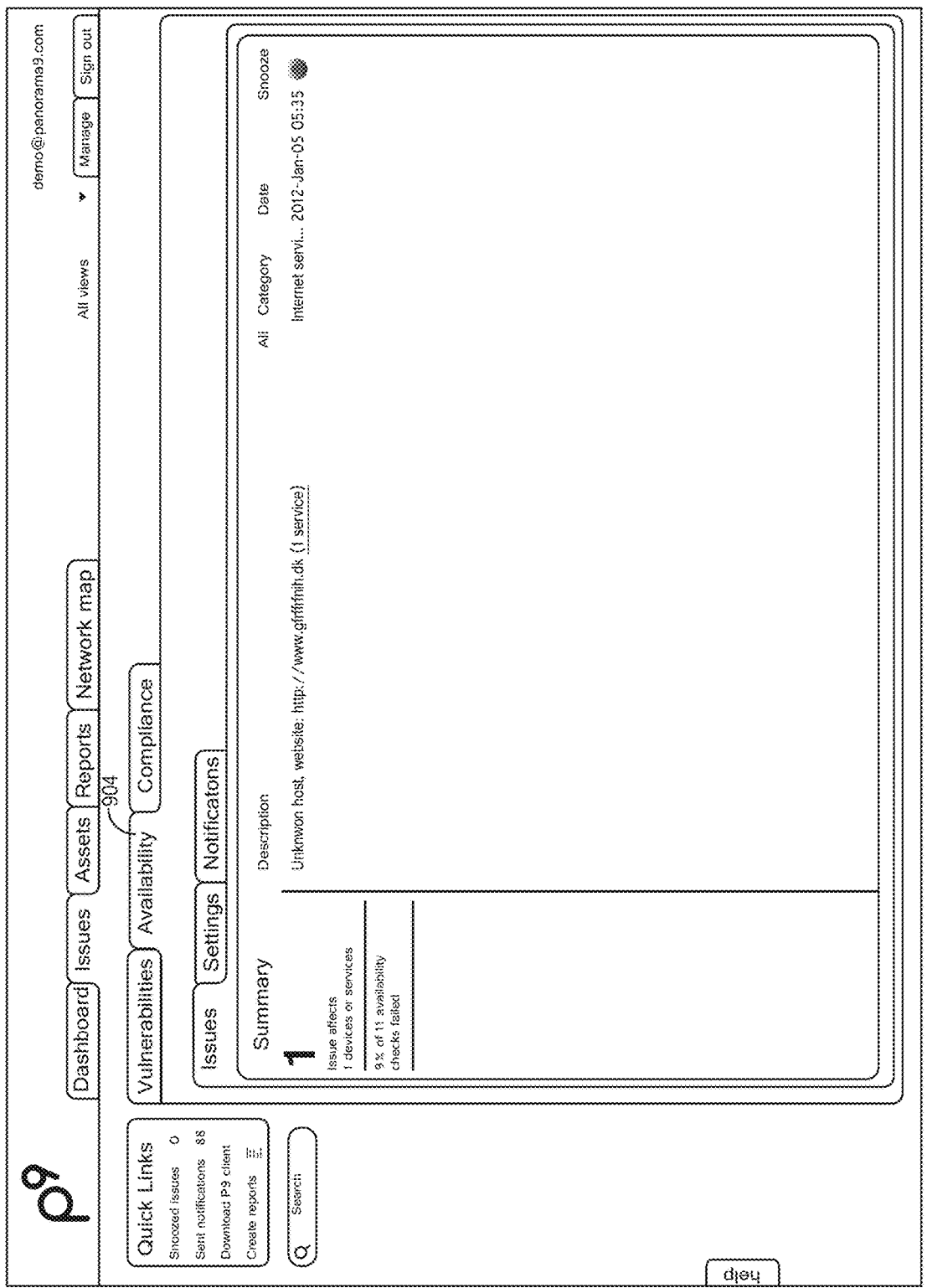
FIG. 9 depicts a portion of a screenshot 900 for displaying availability.

FIG. 9 depicts a portion of a screenshot 900 for displaying availability. The availability tab 904 has three sub-tabs, issues, settings, and notifications. In the example of FIG. 9, an unknown host issue is illustrated.

Figure 10:
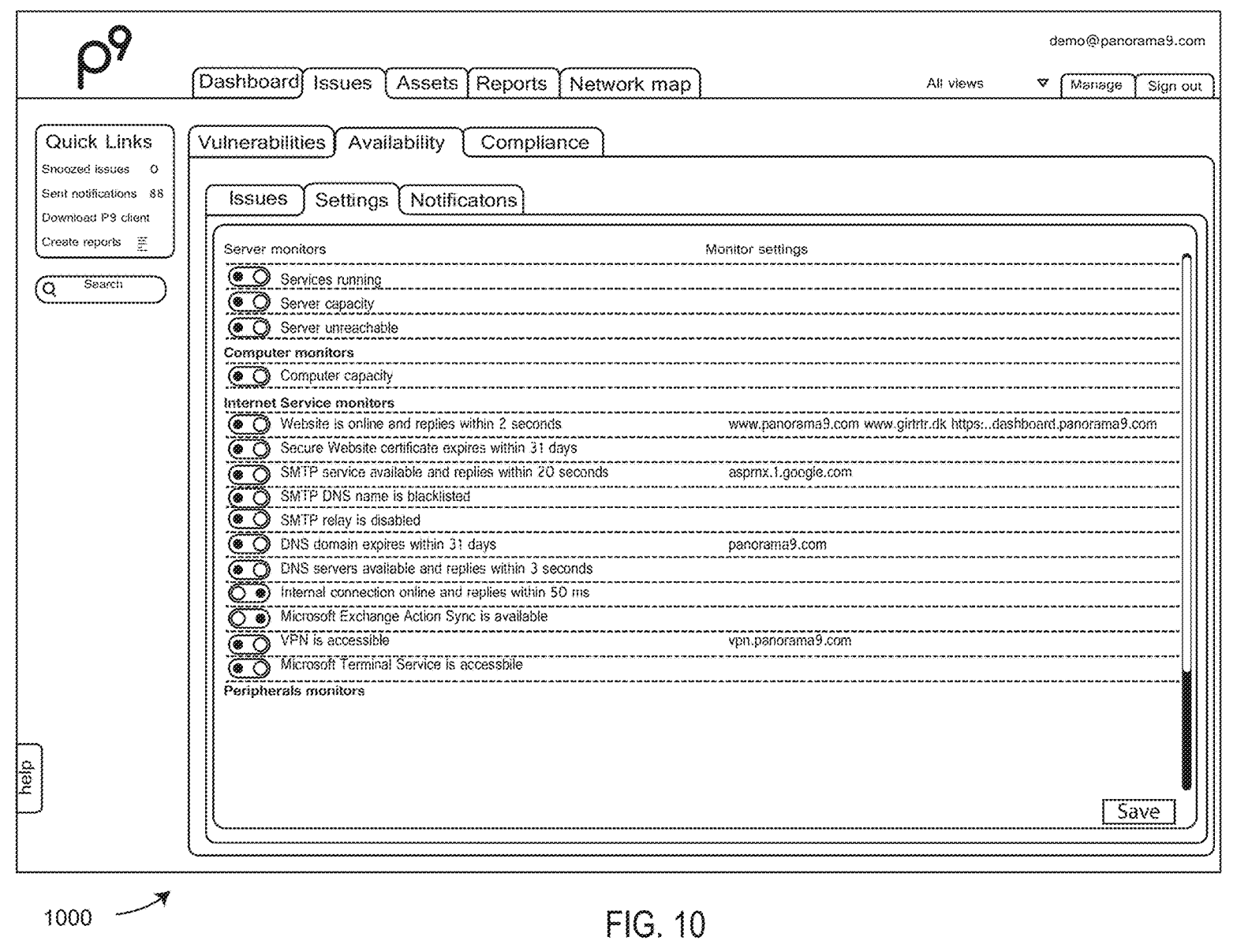

FIG. 10 depicts a portion of a screenshot 1000 for displaying availability settings. The complexity of the monitors is implementation- and/or configuration-specific. For example, there is no particular reason the issues must all be controlled with a toggle (as illustrated in the example of FIG. 10) and could instead be implemented with other controls (e.g., a slider).

Figure 11:
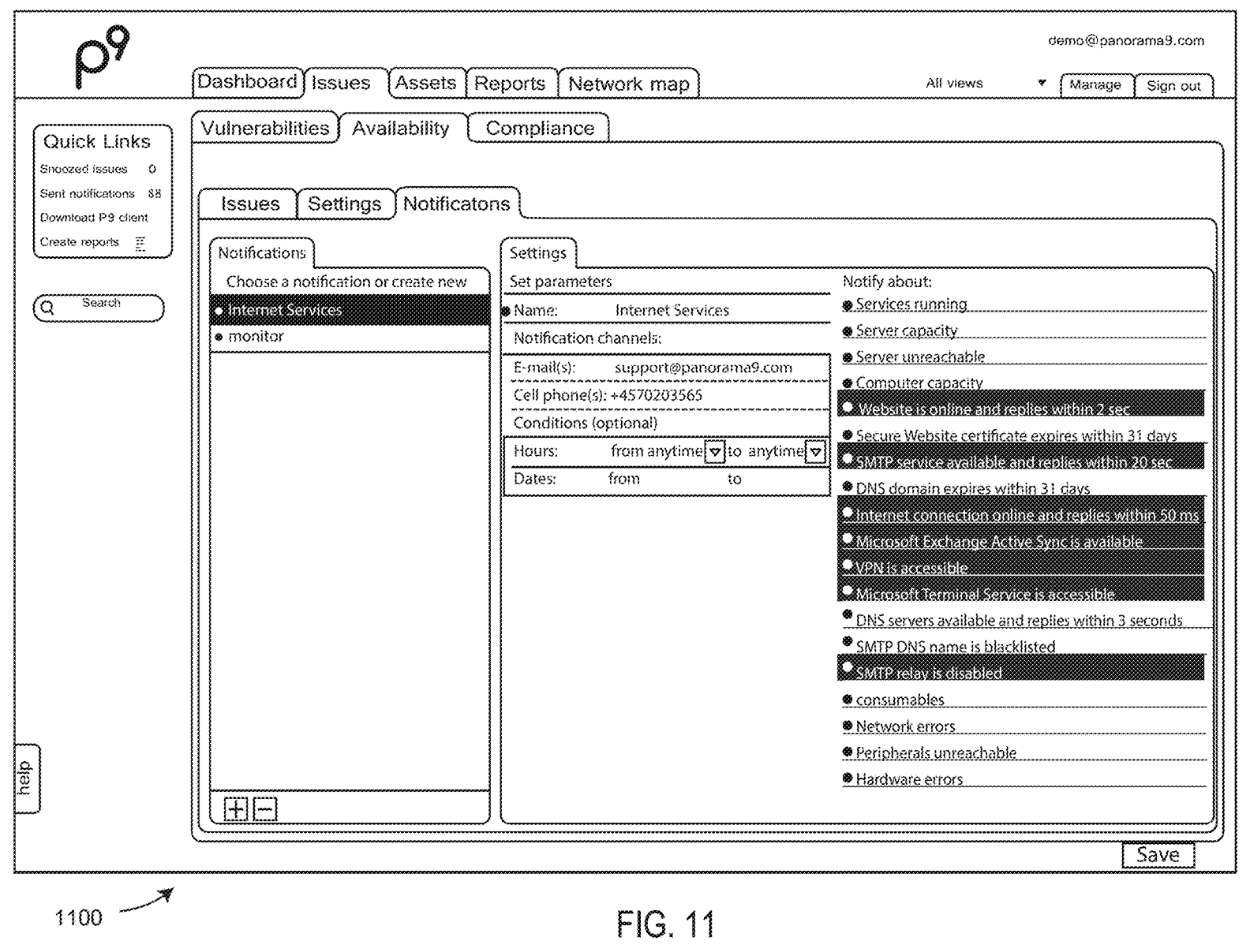

FIG. 11 depicts a portion of a screenshot 1100 for displaying availability notifications. The notification channel (e.g., email, cell phone, etc.) and conditions can be set as appropriate.

Figure 12:
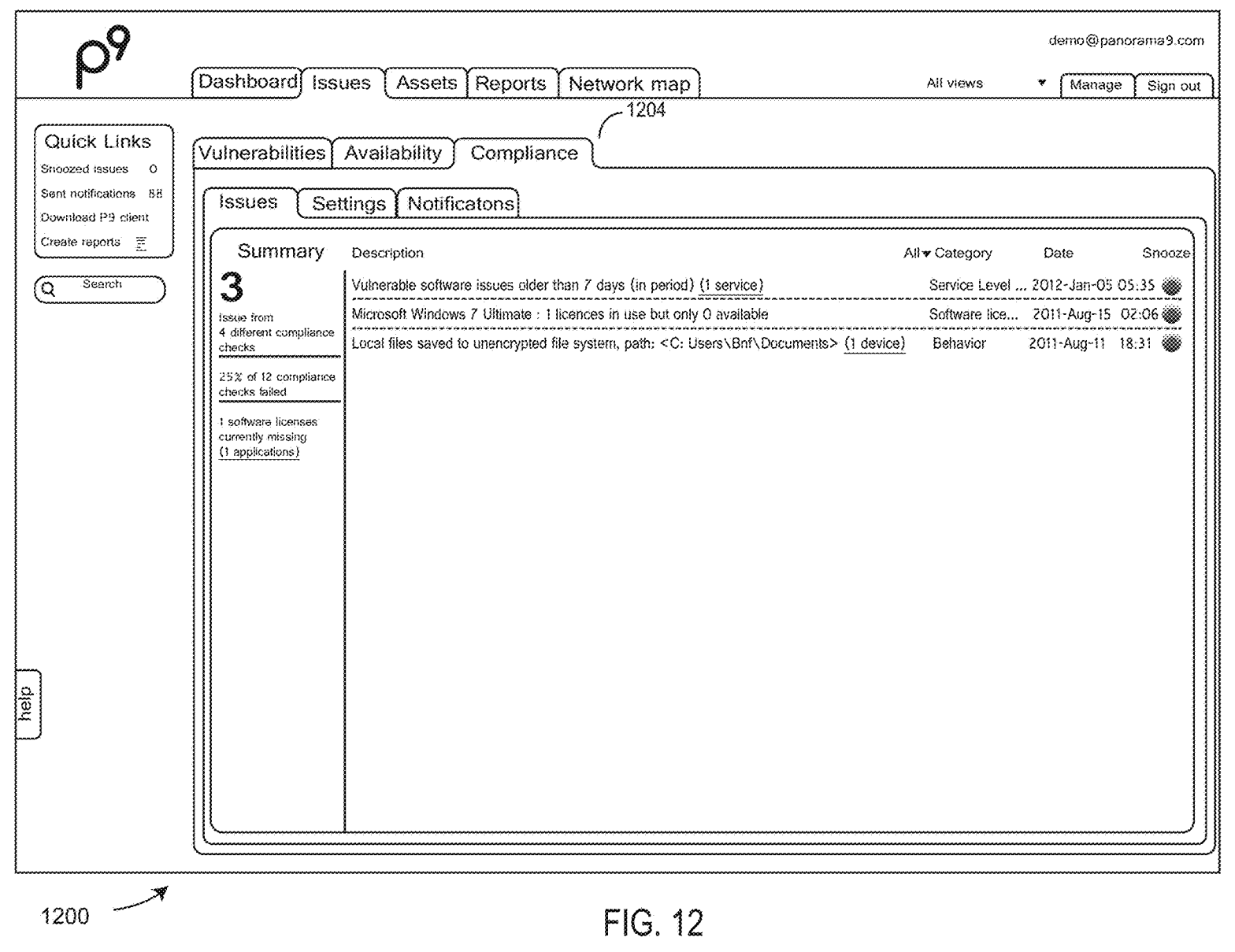

FIG. 12 depicts a portion of a screenshot 1200 for displaying compliance. The compliance tab 1204 has three sub-tabs, issues, settings, and notifications. In the example of FIG. 12, issues related to vulnerability, license, and behavior that are not in compliance with policy are presented by way of example.

Figure 13:
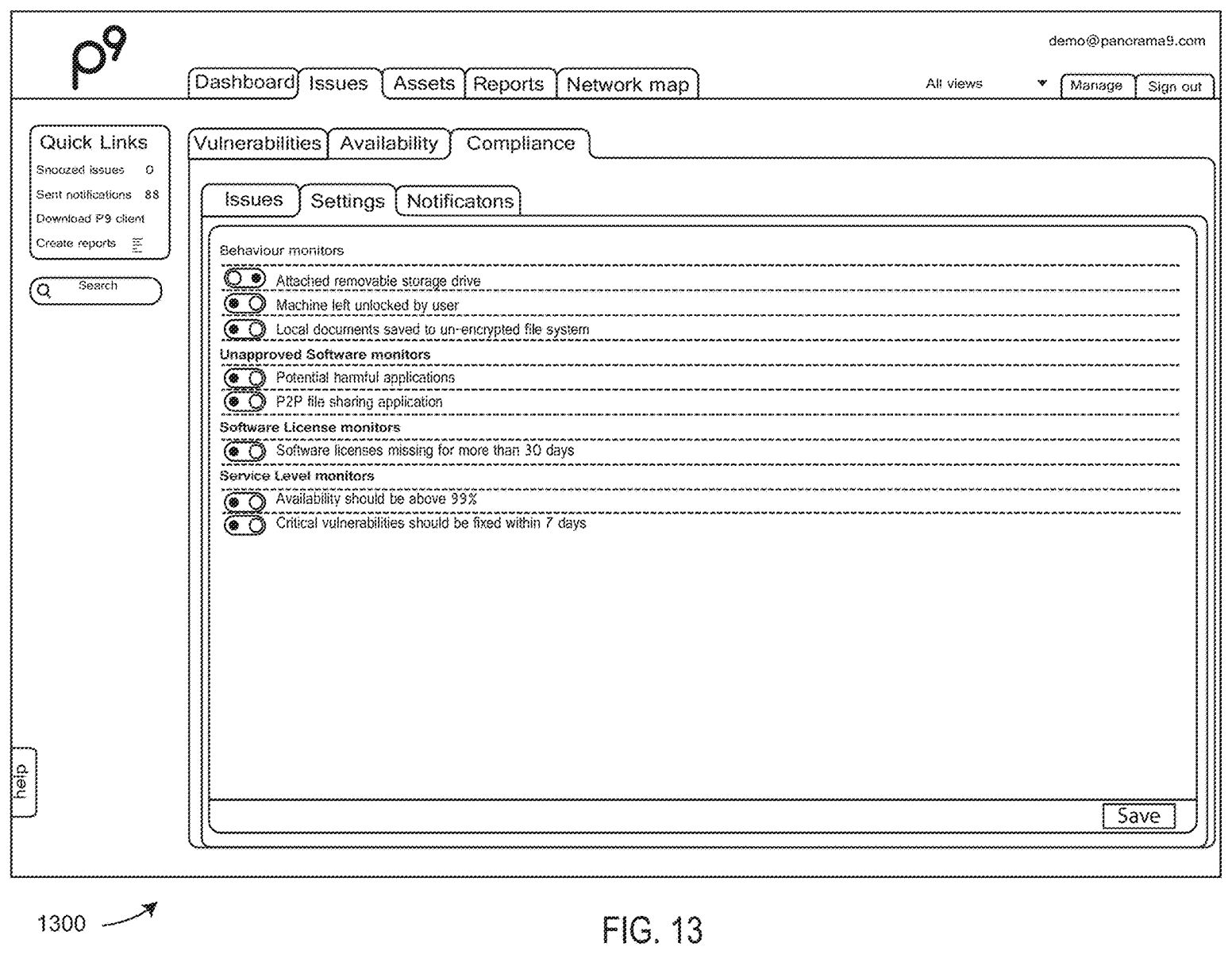

FIG. 13 depicts a portion of a screenshot 1300 for displaying compliance settings. The complexity of the monitors is implementation- and/or configuration-specific. For example, there is no particular reason the issues must all be controlled with a toggle (as illustrated in the example of FIG. 13) and could instead be implemented with other controls (e.g., a slider).

Figure 14:
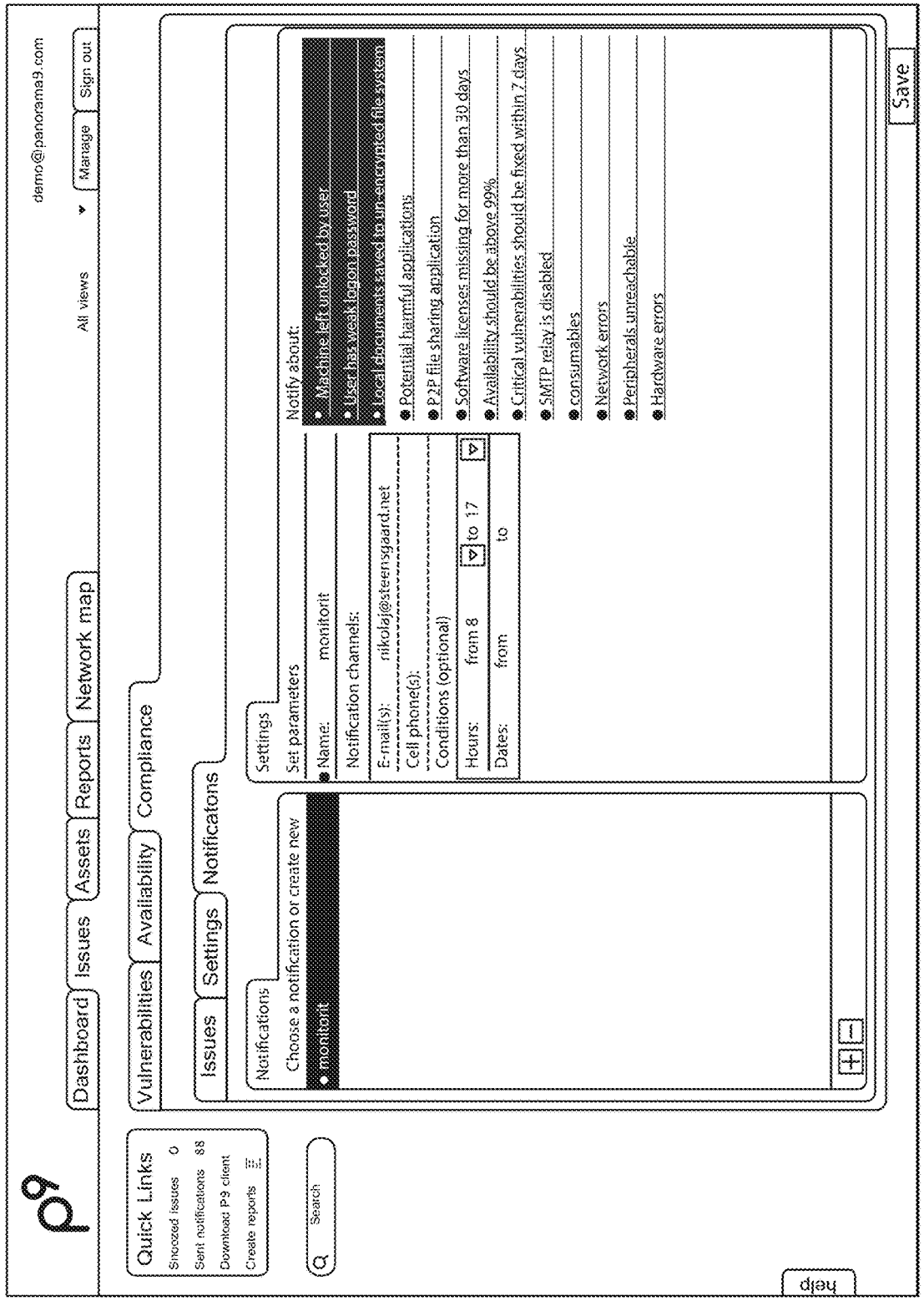
FIG. 14 depicts a portion of a screenshot 1400 for displaying compliance notifications.

FIG. 14 depicts a portion of a screenshot 1400 for displaying compliance notifications. The notification channel (e.g., email, cell phone, etc.) and conditions can be set as appropriate. Advantageously, because the system can provide real-time analysis of the network, a system administrator or other party can detect unapproved activity (e.g., going to a forbidden website) as it happens and stop the installation remotely or automatically. The system administrator can trigger to notify when a person logs into a certain computer, violates IP policy, etc. The system administrator can also be made aware of whether a device is inside the network or remoting in (e.g., geo-location) and whether a geo-location is acceptable (e.g., Yemen might be an unacceptable location or may have associated geo-location-based restrictions).

Figure 15:
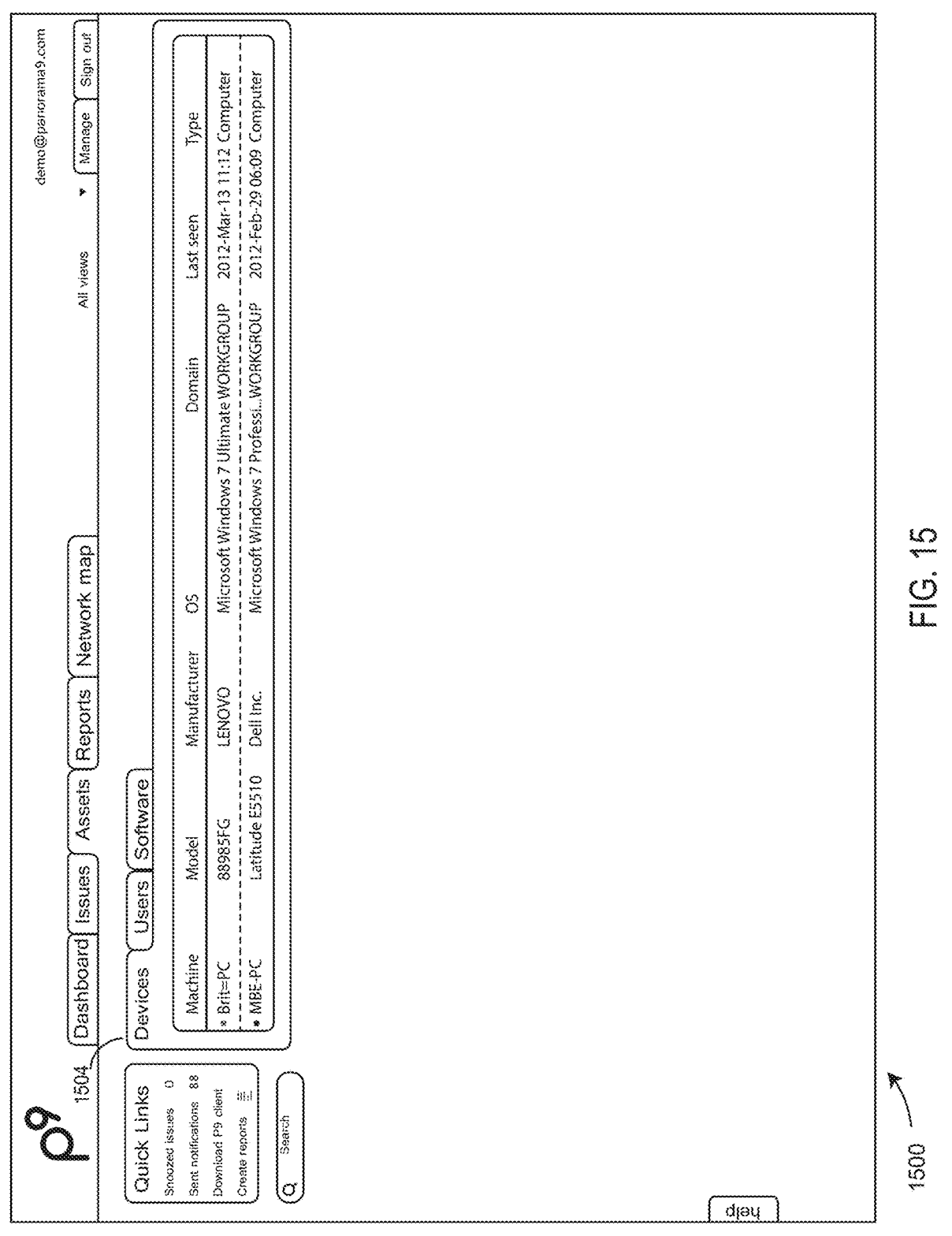

FIG. 15 depicts a portion of a screenshot 1500 for displaying assets. The devices tab 1504 displays two devices in this example.

Figure 16:
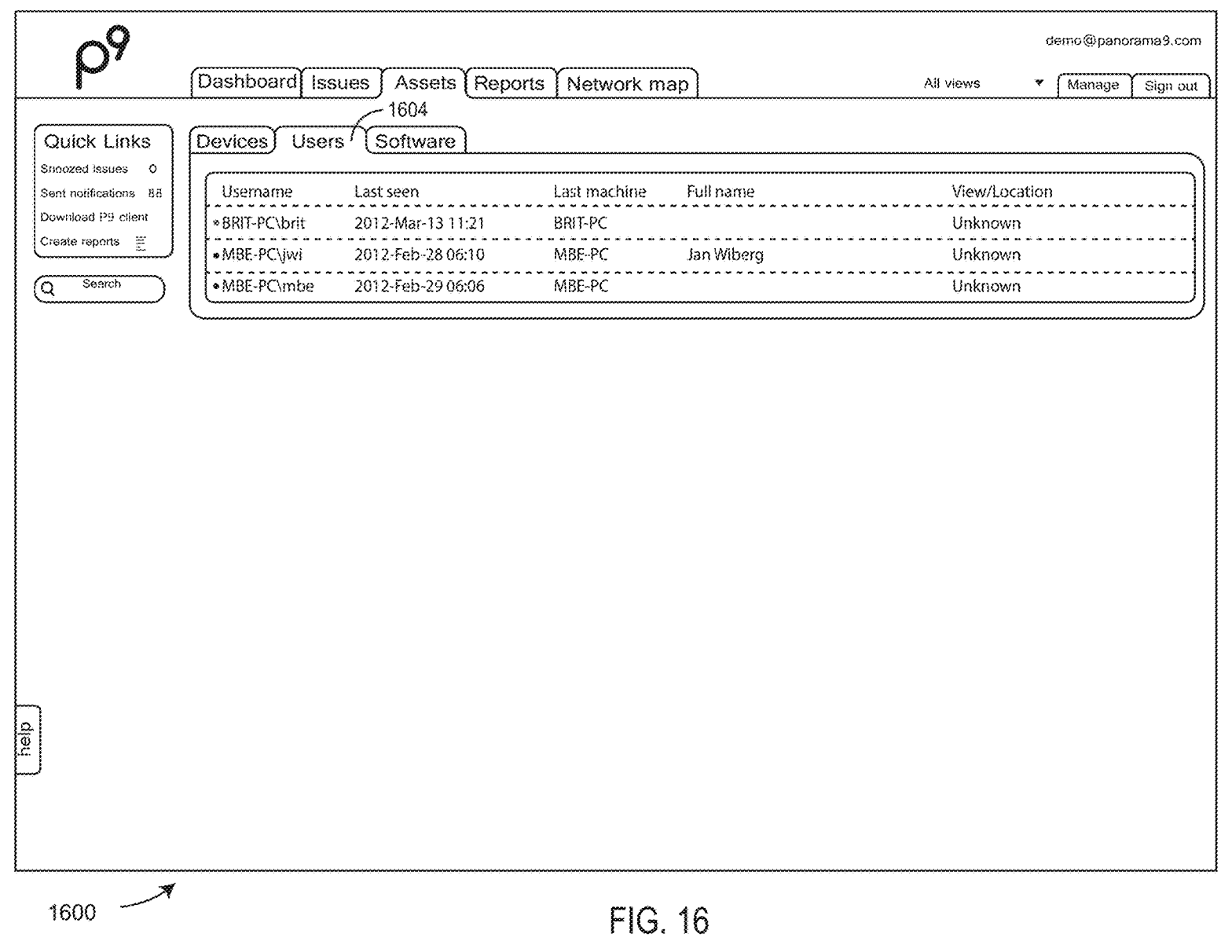

FIG. 16 depicts a portion of a screenshot 1600 for displaying assets. The users tab 1604 displays three users in this example. Depending upon the implementation, users can be identified by location, such as geo-location, whether remoting in, etc. This can be valuable in ensuring that a user is in an acceptable geo-location. This functionality can also be used for theft control.

FIG. 17 depicts a portion of a screenshot 1700 for displaying assets. The software tab 1704 displays software that is installed on devices in the administered network of this example.

Figure 18:
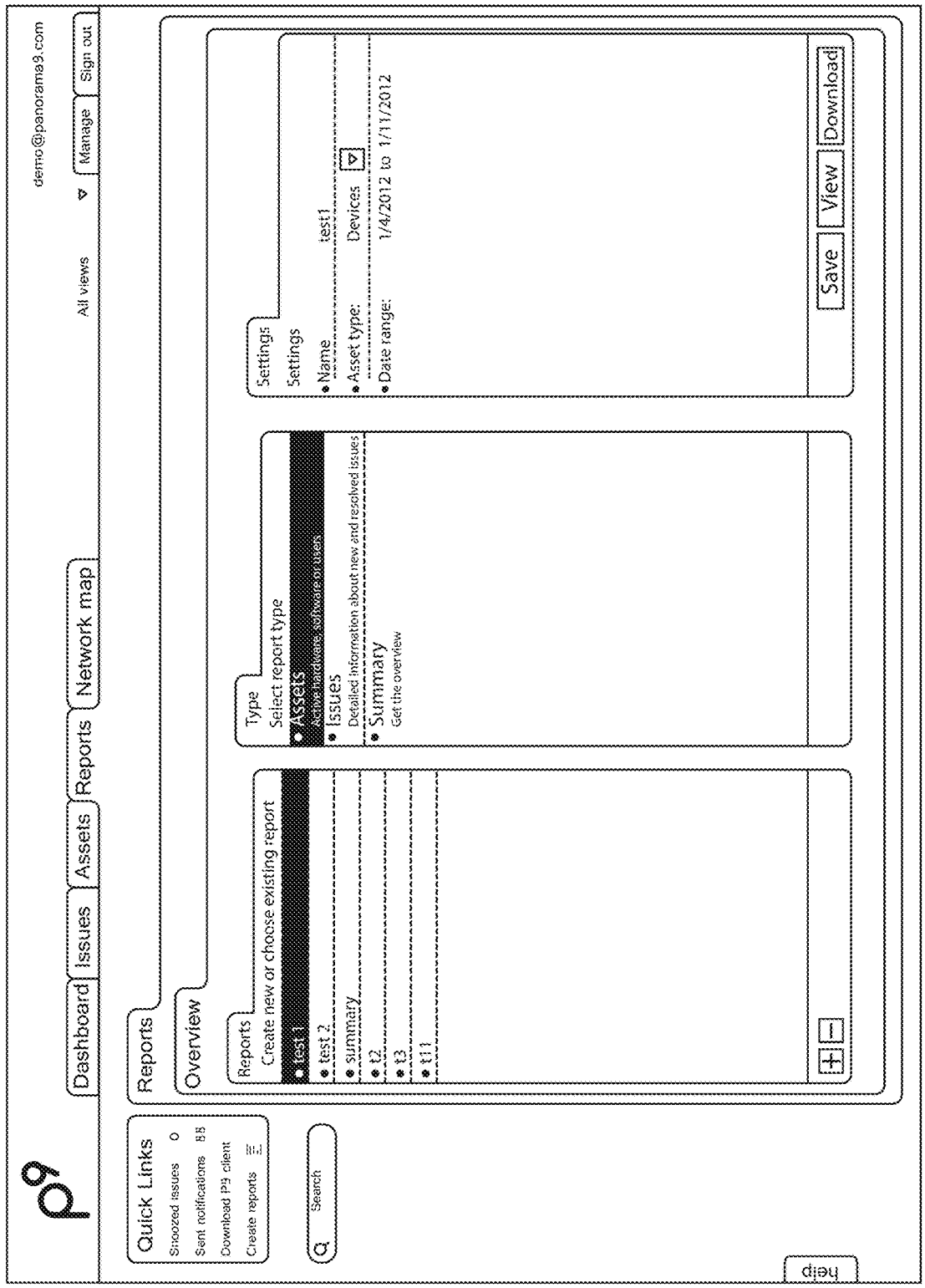
FIG. 18 depicts a portion of a screenshot 1800 for displaying reports.

FIG. 18 depicts a portion of a screenshot 1800 for displaying reports. Reports can take advantage of the unique capabilities of the system to provide information that would not be available when making use a static (e.g., spreadsheet or other not-real-time) system administration tool.

Figure 19:
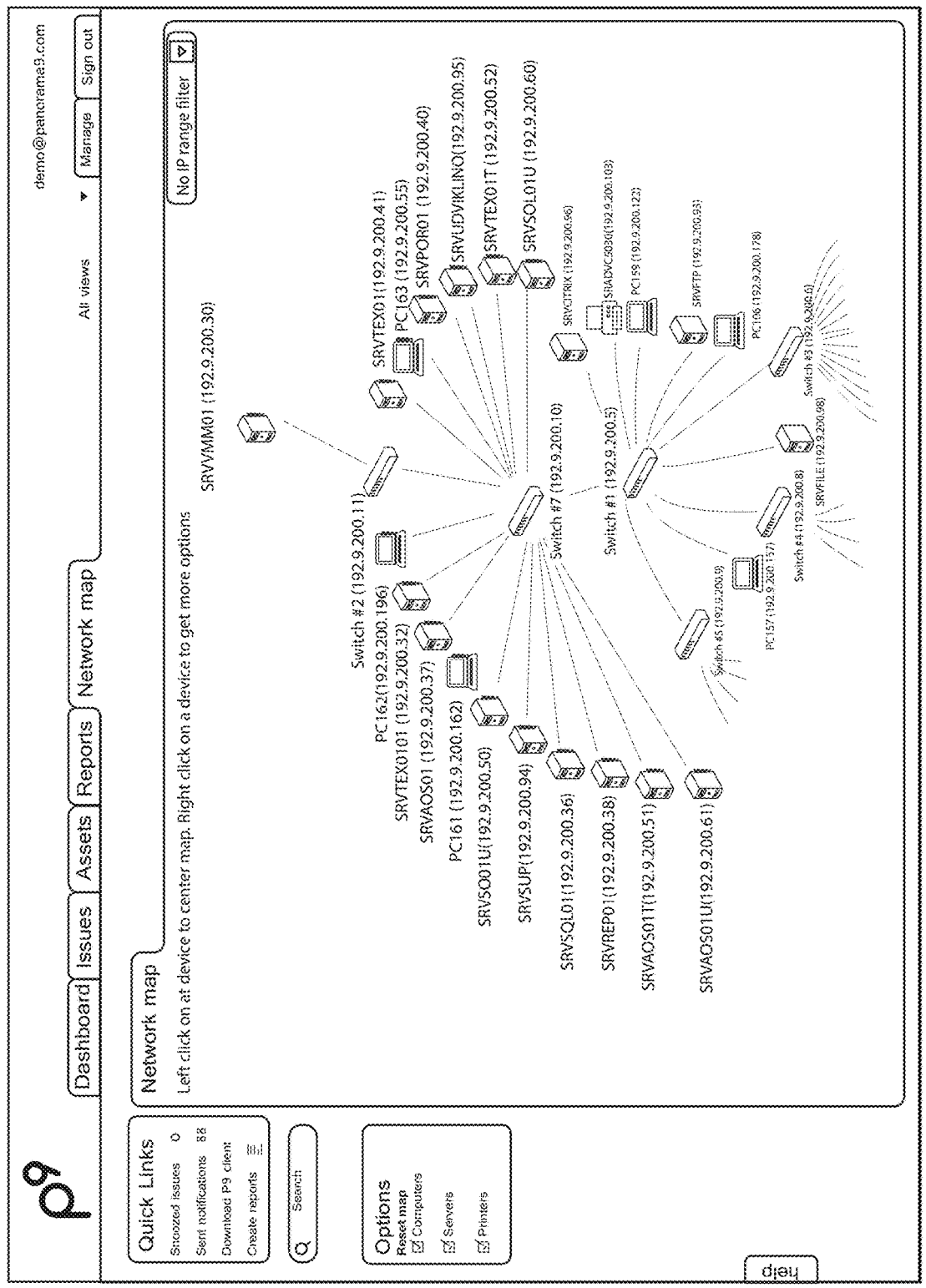
FIG. 19 depicts a portion of a screenshot 1900 for displaying a network map.
Figure 20:
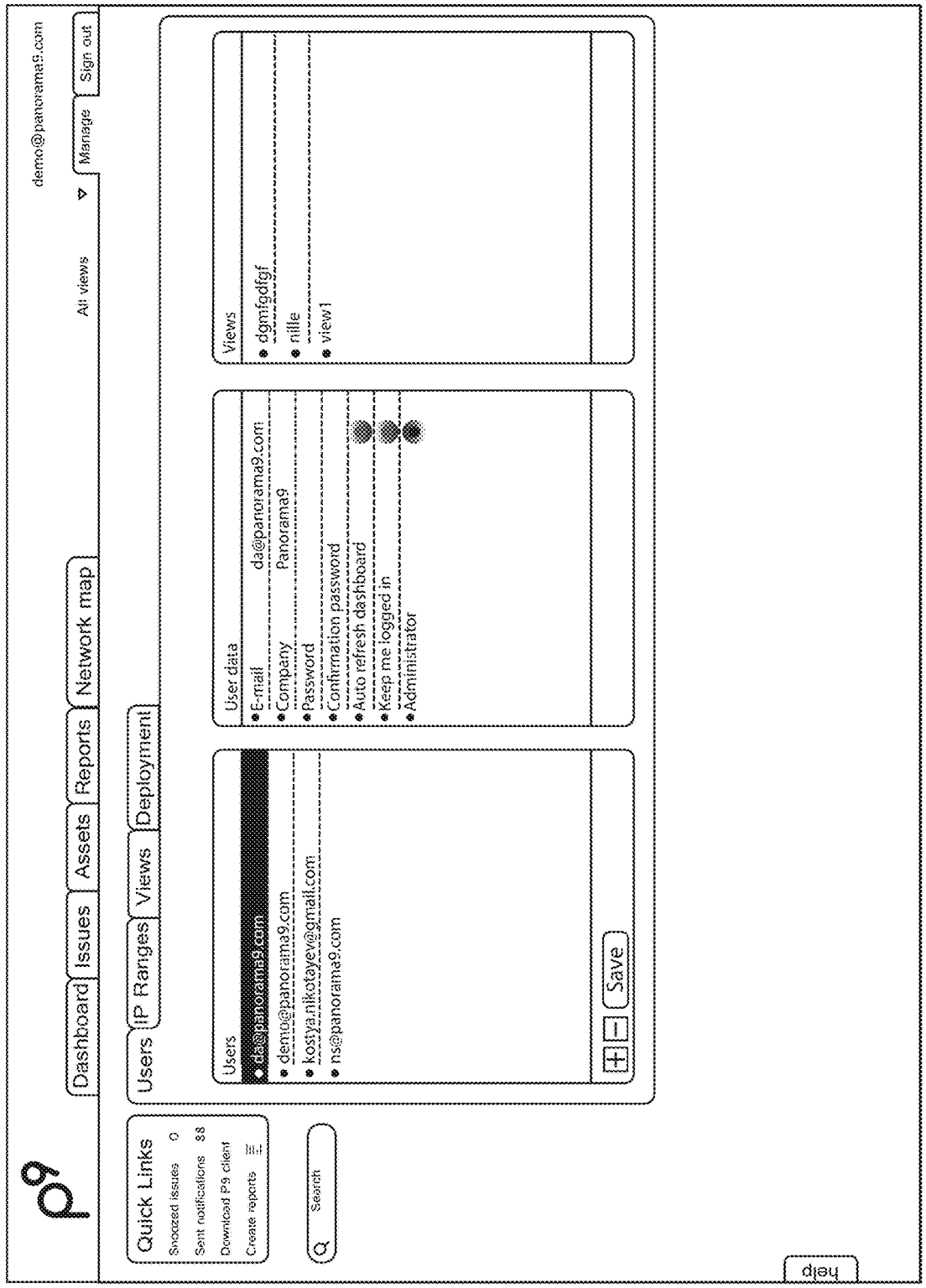
FIG. 20 depicts a portion of a screenshot 2000 for managing users, IP ranges, views, and deployment.
Figure 21:
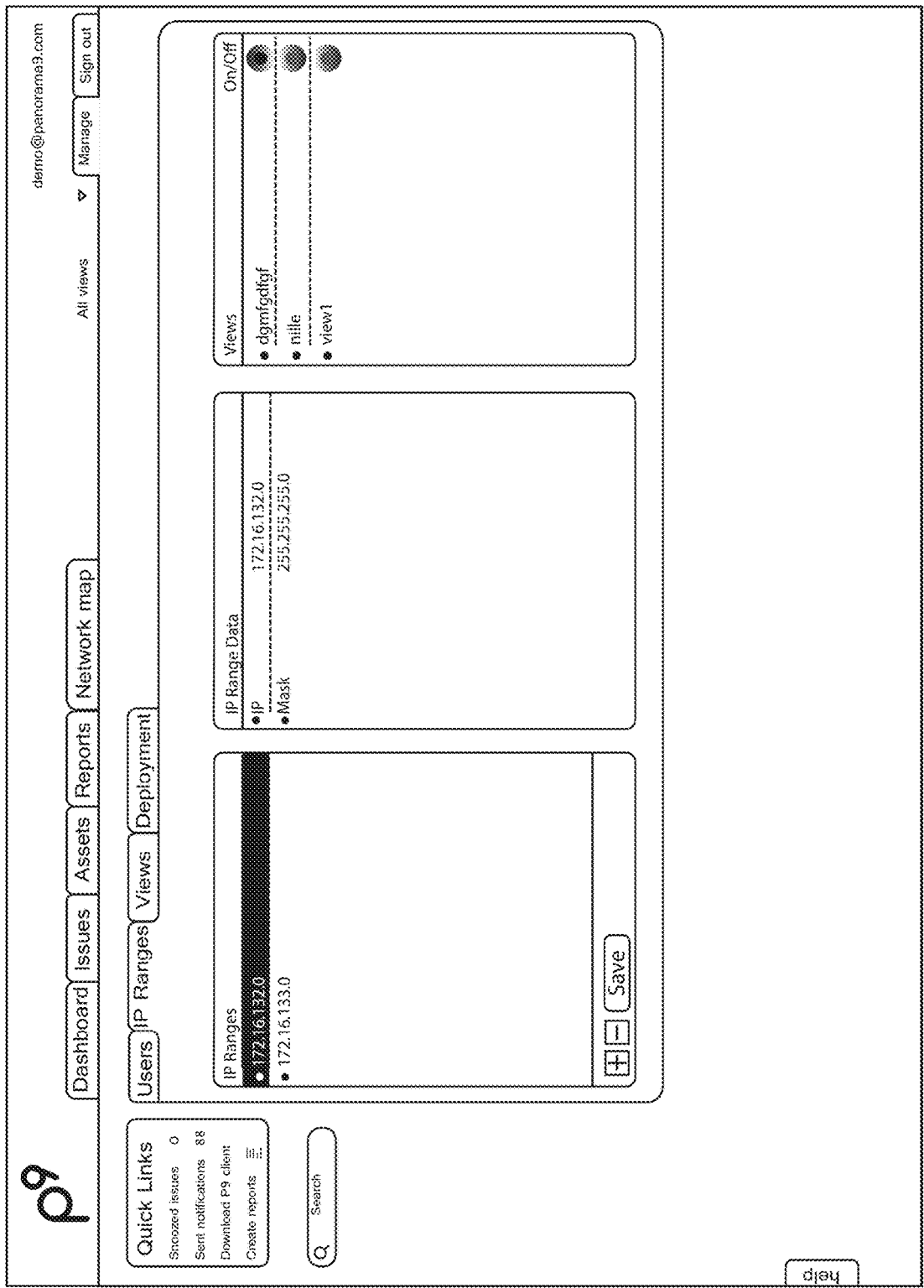
FIG. 21 depicts another portion of a screenshot 2100 for managing users, IP ranges, views, and deployment.
Figure 22:
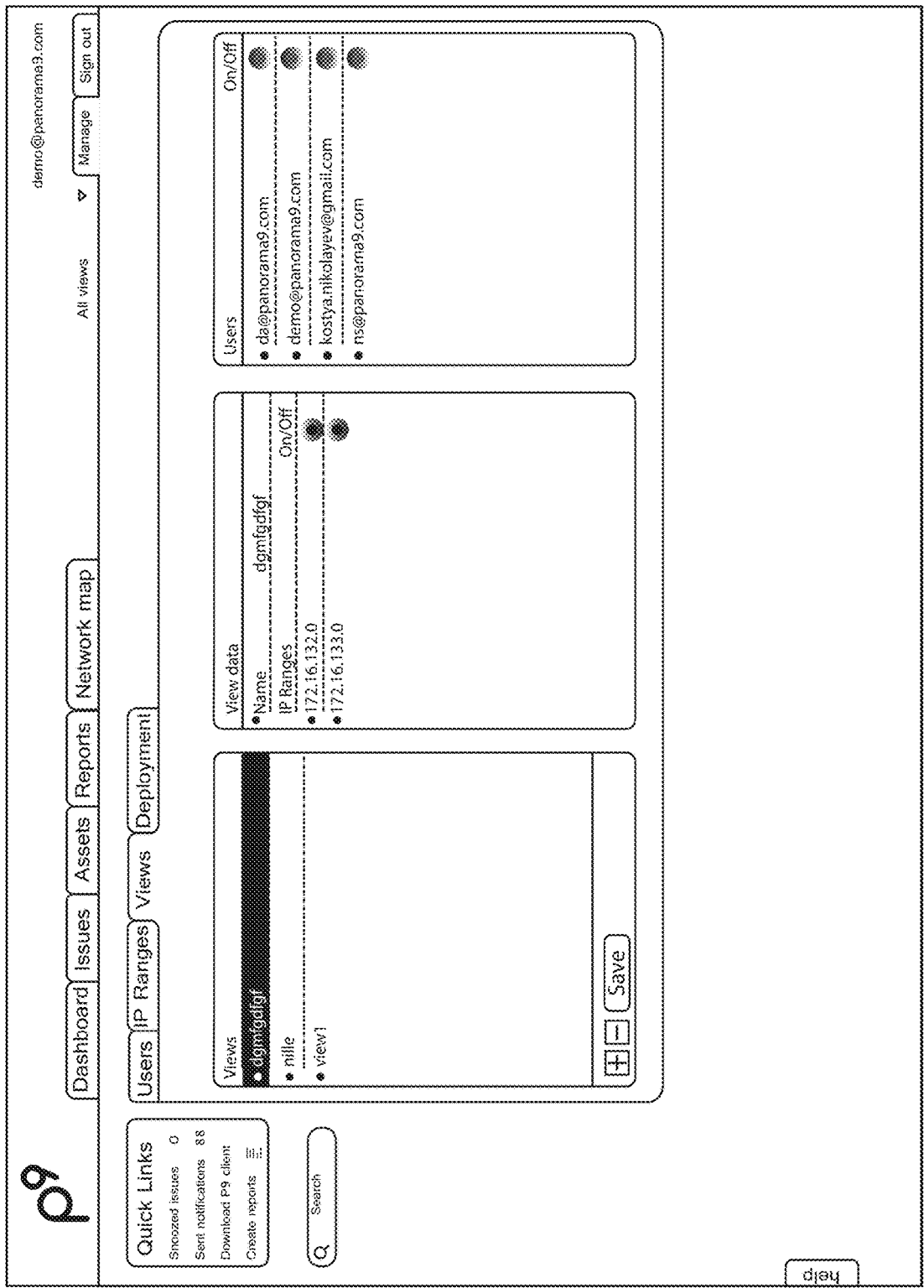
FIG. 22 depicts another portion of a screenshot 2200 for managing users, IP ranges, views, and deployment.

FIG. 19 depicts a portion of a screenshot 1900 for displaying a network map. Advantageously, the network map is real-time, and changes automatically when the network changes.

FIGS. 20-23 depict a portion of a screenshots 2000 to 2300 for managing users, IP ranges, views, and deployment.

Figure 24:
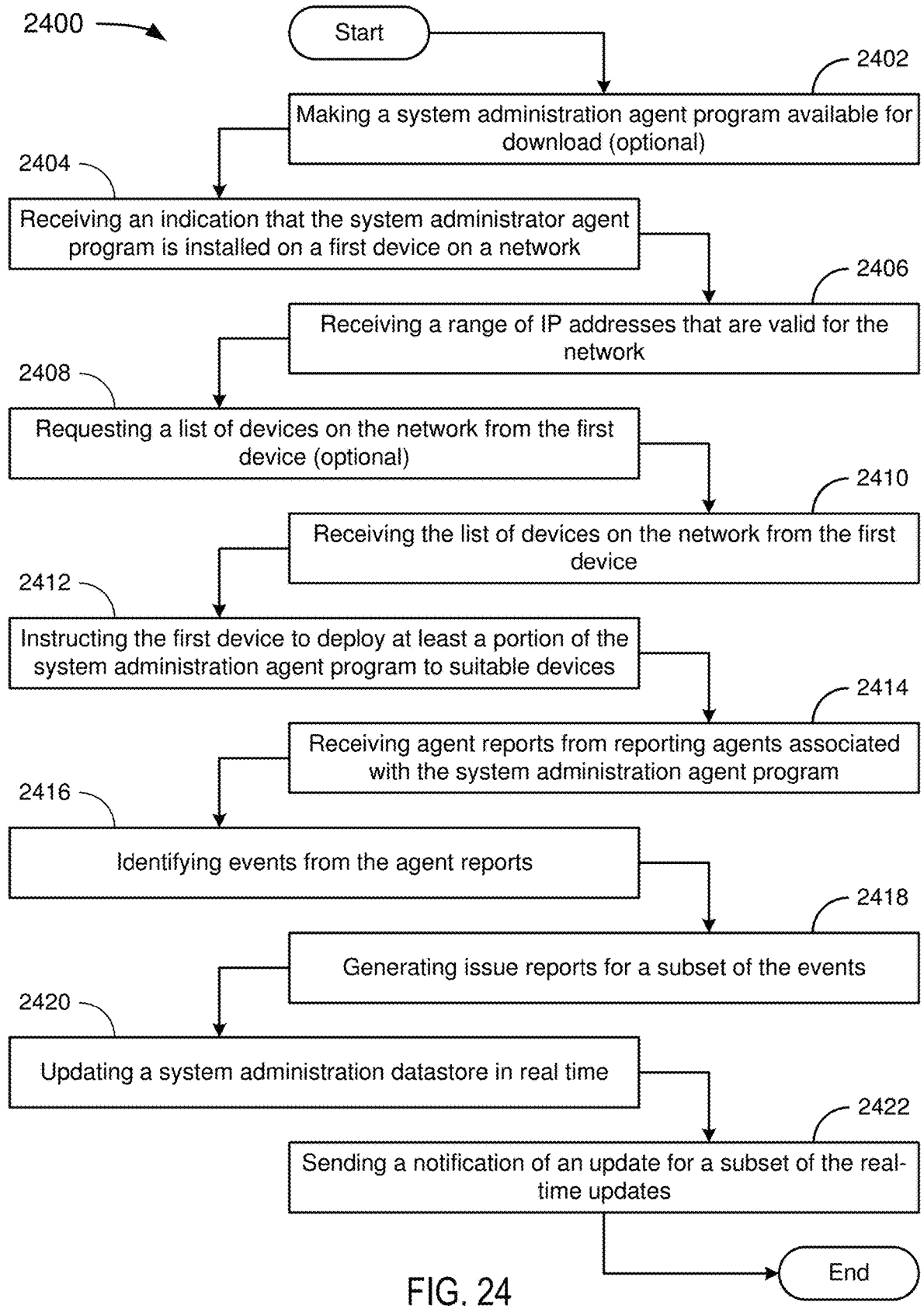
FIG. 24 depicts a flowchart of an example of a method for real-time system administration.

FIG. 24 depicts a flowchart 2400 of an example of a method for real-time system administration. This flowchart and other flowcharts are depicted in the figures of this paper as serially arranged modules. However, modules of the flowcharts may be reordered or arranged for parallel execution as appropriate.

In the example of FIG. 24, the flowchart 2400 starts at module 2402 with making a system administration program available for download. The module 2402 is optional because the system administration program can be made available through any applicable mechanism, such as providing the program on a removable storage device. Also, making the program available can be by an entity other than the entity responsible for assisting in the real-time administration of a network into which the program is introduced.

In the example of FIG. 24, the flowchart 2400 continues to module 2404 with receiving an indication that the system administrator agent program is installed on a first device on a network. The indication can be in any applicable form, including receiving some other indication (e.g., the IP ranges valid for the network).

In the example of FIG. 24, the flowchart 2400 continues to module 2406 with receiving a range of IP addresses that are valid for the network. Depending upon the implementation, the valid IP address range is provided before, during, or after a registration procedure, during which information associated with the network is provided to a system administration server. The system administration service is likely to be password-protected for a given network; so the registration procedure is likely to include at least generating or obtaining a userid and a password for the user (e.g., a system administrator of the given network). Other information can also be useful, such as multiple notification channels for the system administrator and other users. Depending upon how the network owner compensates the provider of the system administration service, the registration procedure may or may not also include collecting financial information.

In the example of FIG. 24, the flowchart 2400 continues to module 2408 with requesting a list of devices on the network from the first device. The system administration program incorporated into the network includes a reporting agent that can query an ARP engine to identify the devices. The ARP engine can be implemented in a number of ways, some of which can be conveniently queried through, e.g., an API. An example of a relatively convenient ARP engine is a domain controller in windows-based machines. Some ARP engines are a bit more opaque and/or distributed, potentially requiring proprietary knowledge to generate the list, querying more than one agent, or the like. It should be understood, however, that all robust networks have an ARP engine that is aware of all devices on the network (even if the ARP engine is distributed across each of the devices in an extreme case). Strictly speaking, requesting the list of devices is optional because such information could conceivably be pushed to the system administration server by the reporting agent on the network.

In the example of FIG. 24, the flowchart 2400 continues to module 2410 with receiving the list of devices on the network from the first device. It may or may not be desirable to install a system administrator agent program on each of the devices.

In the example of FIG. 24, the flowchart 2400 continues to module 2412 with instructing the first device to deploy at least a portion of the system administration agent program to suitable devices. In a specific implementation, the system administration agent program includes a deployment agent that is capable of deploying the system administration agent program, or a portion thereof, to other devices. Where the system administration agent program is deployed in its entirety, it may be desirable to activate a deployment agent in only one device (leaving the deployment agent inactive in other devices), to prevent multiple deployment agents from becoming confused about where deployment has been done. In an alternative, the deployment agent portion of the system administration agent program is not deployed or a "deployed version" is provided to other devices, which is different from the master version. It is expected that the devices to which the system administration agent program are deployed will activate a reporting agent and a system monitoring agent (in addition to the active deployment agent, if applicable). Strictly speaking, the instructing the first device to deploy at least a portion of the system administration agent program is optional because the deployment agent can, depending upon implementation and/or configuration, determine to which devices the system administration agent program should be deployed without input from the system administration server.

In the example of FIG. 24, the flowchart 2400 continues to module 2414 with receiving agent reports from reporting agents associated with the system administration agent program. Reporting agents are expected to be active on devices on which the system administration agent program is installed. The reports can include data about the device on which the reporting agent is installed. Typically, useful information for reporting can be obtained by a system monitoring agent that is active on the same device as the reporting agent. The system monitoring agent can obtain information about neighboring devices, peripheral devices, or the network environment and the reporting agent can generate an associated agent report. Advantageously, the agent reports can be received in real time as the network changes or new stimuli are detected. In a specific implementation, the agent reports can also or instead be generated upon request.

In the example of FIG. 24, the flowchart 2400 continues to module 2416 with identifying events from the agent reports. The amount of processing that goes into converting an agent report to an event is implementation-specific. The creation of an event can be as simple as stripping off encapsulation and putting payload of an agent report message on an event bus. In other implementations, it may be desirable to determine relevance, delete redundant agent reports, or the like before putting an event on the event bus. It may be noted that the event bus can be conceptual in the sense that there is no actual "bus."

In the example of FIG. 24, the flowchart 2400 continues to module 2418 with generating issue reports for a subset of the events. An expert system that is capable of processing a given event can take the event from the event bus and determine how to resolve the event. If the event can be resolved without taking any action, the event is essentially removed from the event bus and deleted. For events of potential significance that the expert system cannot fully resolve, the expert system can create a new event, which is put back on the event bus for resolution by some other expert system. When an expert determines that an event merits an issue report, the expert system generates an issue report. It may be noted that an expert could conceivably generate an issue report and put another event on the event bus, which can potentially result in more than one issue report being generated for a single agent report.

In the example of FIG. 24, the flowchart 2400 continues to module 2420 with updating a system administration datastore in real time. The system administration datastore can be located in the cloud, online, or in a location that is accessible anyplace, anytime by an appropriately configured device. This enables a system administrator to decide about, e.g., updates or the like without remoting into a computer on the network and without repackaging, e.g., updates. This can be referred to as the "no touch model" of system administration because the system administrator can instruct the system administration server on a desired course of action, then when the relevant device comes online, the device can immediately implement the action (e.g., install an update). The no touch model enables a system administrator to administer devices that are not on the network when the system administrator is not on the network.

In the example of FIG. 24, the flowchart 2400 ends at module 2422 with sending a notification of an update for a subset of the real-time updates. Notification parameters can be set as desired by a system administrator. However, the capabilities of the notification are beyond what is generally available in the state of the art. For example, a system administrator could be notified of an event and the system administrator could take action without even logging into the network. For example, if a user is installing forbidden software, a system administrator can set the notification such that an agent stops the installation before the installation is even completed. The capabilities are enhanced at least in part because a system administrator is aware of all relevant details about an asset (though the precise amount of information is implementation-specific). For example, a reporting agent can indicate whether a device is inside the administered network, remoting in (including geo-location), complying with policy based on geo-location, being used by a user who does not normally use the device, accessing a restricted website (without the restricted website actually being on a blocked list), attempting to access a locked peripheral device (potentially enabling access with a notice to the device), attempting to save unencrypted data on the device (potentially preventing the save), or take advantage of a number of other capabilities.

The nature of the system facilitates an efficient theft-control system. If a device is reported lost or stolen, an agent can immediately carry out a theft control protocol no matter where the device is located (even if it cannot be detected). When the device is turned on, the system administration server, which is in the cloud, can carry out the theft control protocol even if the network servers are all down (or even if the network server was implemented on the device that was lost or stolen). The theft control protocol can lock the computer immediately, encrypt the contents, and download the contents. Moreover, the system administration server can use agent reports and/or geo-location data to track the geo-location of the device. For example, an agent in the computer could report three hot spot locations that could be used to triangulate the current geo-location of the device using, e.g., RSSI. In a specific implementation, the theft control protocol can be executed at the touch of a button (the "theft control button") or carried out automatically be a theft control expert when the device is reported missing.

To the extent techniques are presented in this paper in terms of algorithms and symbolic representations of operations on data bits within a computer memory. These algorithmic descriptions and representations are used by those skilled in computer science to convey substance to others skilled in the art. An algorithm is here, and generally, conceived to be a self-consistent sequence of operations leading to a desired result. The algorithms can be implemented on computer systems with instructions to configure the computer systems in a specific manner in accordance with the teachings described in this paper as specifically purposed computer systems, or it may prove convenient to construct specialized apparatus to perform the some embodiments. Algorithms implemented on computer systems require physical manipulations of physical quantities, resulting in the transformation of data. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise in this paper, discussions utilizing terms such as "processing," "computing," "calculating," "determining," "displaying," "generating," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 25:
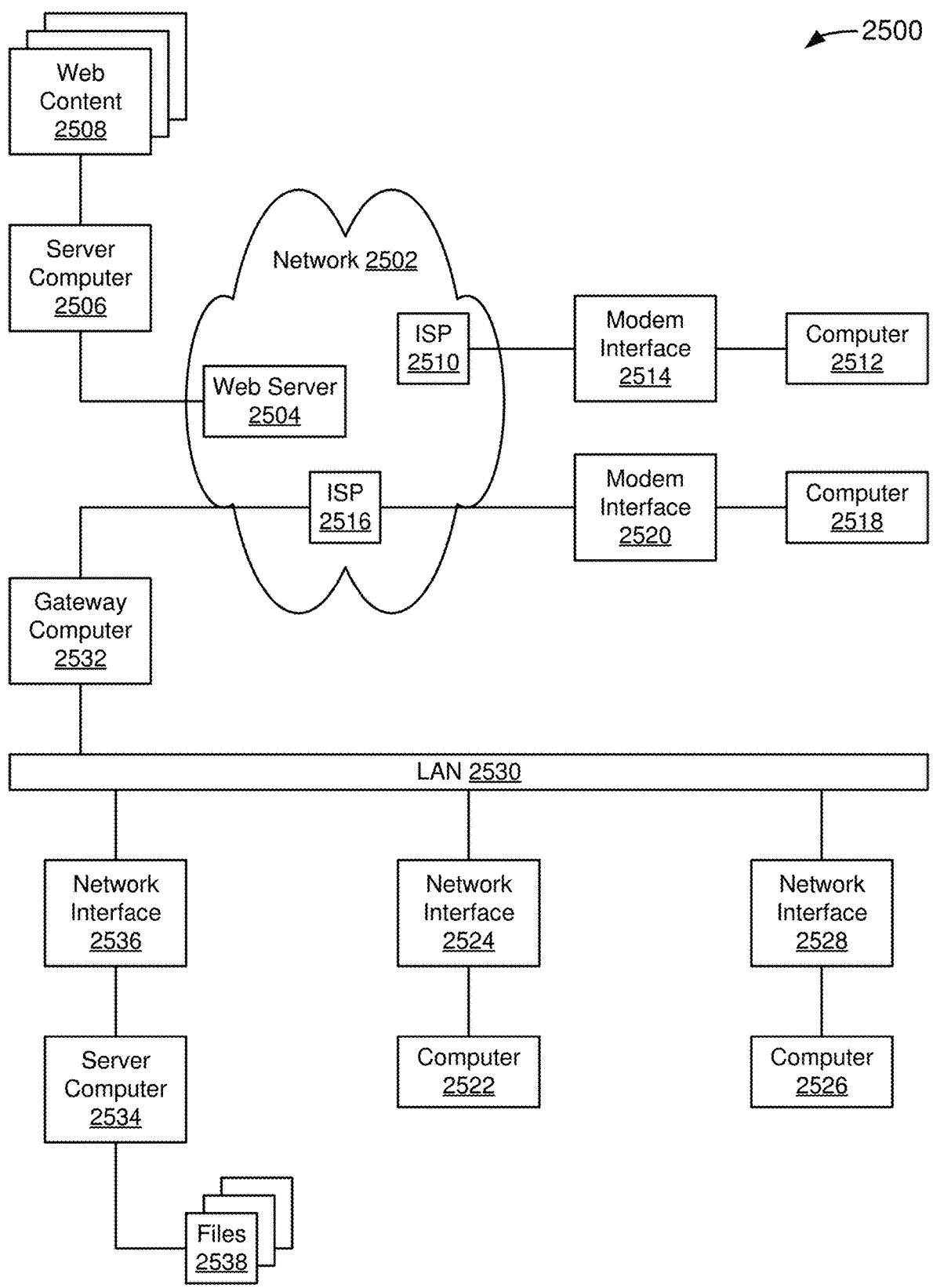
FIG. 25 depicts a system on which a real time system administration system can be implemented.

FIG. 25 depicts a system on which at least a portion of a real-time system administration system can be implemented. FIG. 25 depicts a networked system 2500 that includes several computer systems coupled together through a network 2502, such as the Internet. The web server 2504 is typically at least one computer system which operates as a server computer system and is configured to operate with the protocols of the world wide web and is coupled to the Internet. Optionally, the web server 2504 can be part of an ISP which provides access to the Internet for client systems. The web server 2504 is shown coupled to the server computer system 2506 which itself is coupled to web content 2508, which can be considered a form of media datastore. While two computer systems 2504 and 2506 are shown in FIG. 25, the web server system 2504 and the server computer system 2506 can be one computer system having different software components providing the web server functionality and the server functionality provided by the server computer system 2506, which will be described further below.

Access to the network 2502 is typically provided by Internet service providers (ISPs), such as the ISPs 2510 and 2516. Users on client systems, such as client computer systems 2512, 2518, 2522, and 2526 obtain access to the Internet through the ISPs 2510 and 2516. Access to the Internet allows users of the client computer systems to exchange information, receive and send e-mails, and view documents, such as documents which have been prepared in the HTML format. These documents are often provided by web servers, such as web server 2504, which are referred to as being "on" the Internet. Often these web servers are provided by the ISPs, such as ISP 2510, although a computer system can be set up and connected to the Internet without that system also being an ISP.

Client computer systems 2512, 2518, 2522, and 2526 can each, with the appropriate web browsing software, view HTML pages provided by the web server 2504. The ISP 2510 provides Internet connectivity to the client computer system 2512 through the modem interface 2514, which can be considered part of the client computer system 2512. The client computer system can be a personal computer system, a network computer, a web TV system, or other computer system. While FIG. 25 shows the modem interface 2514 generically as a "modem," the interface can be an analog modem, isdn modem, cable modem, satellite transmission interface (e.g. "direct PC"), or other interface for coupling a computer system to other computer systems.

Similar to the ISP 2514, the ISP 2516 provides Internet connectivity for client systems 2518, 2522, and 2526, although as shown in FIG. 25, the connections are not the same for these three computer systems. Client computer system 2518 is coupled through a modem interface 2520 while client computer systems 2522 and 2526 are part of a LAN 2530.

Client computer systems 2522 and 2526 are coupled to the LAN 2530 through network interfaces 2524 and 2528, which can include Ethernet or other network interfaces. The LAN 2530 is also coupled to a gateway computer system 2532 which can provide firewall and other Internet-related services for the local area network. This gateway computer system 2532 is coupled to the ISP 2516 to provide Internet connectivity to the client computer systems 2522 and 2526. The gateway computer system 2532 can be a conventional server computer system.

Alternatively, a server computer system 2534 can be directly coupled to the LAN 2530 through a network interface 2536 to provide files 2538 and other services to the clients 2522 and 2526, without the need to connect to the Internet through the gateway system 2532.

Figure 27:
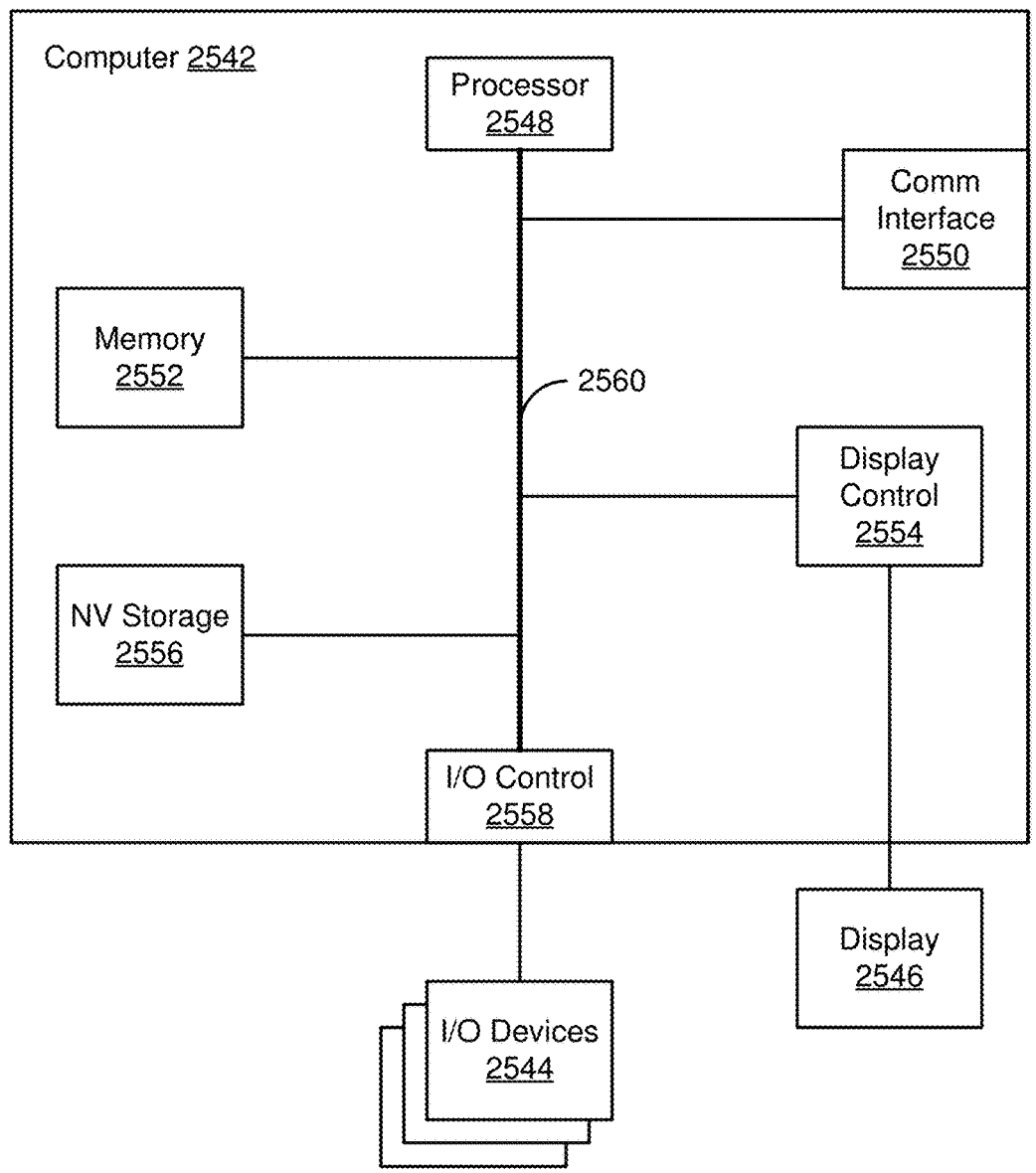
FIG. 27 depicts a computer system for use in the system.

FIG. 27 depicts a computer system 2540 for use in the system 2500. The computer system 2540 can be used as a client computer system or a server computer system or as a web server system, when specially purposed to fulfill the particular role. Such a computer system can be used to perform many of the functions of an Internet service provider, such as ISP 2510. In the example of FIG. 25, the computer system 2540 includes a computer 2542, I/O devices 2544, and a display device 2546. The computer 2542 includes a processor 2548, a communications interface 2550, memory 2552, display controller 2554, non-volatile storage 2556, and I/O controller 2558. The computer system 2540 may be couple to or include the I/O devices 2544 and display device 2546.

The computer 2542 interfaces to external systems through the communications interface 2550, which may include a modem or network interface. It will be appreciated that the communications interface 2550 can be considered to be part of the computer system 2540 or a part of the computer 2542. The communications interface can be an analog modem, ISDN modem, cable modem, token ring interface, satellite transmission interface (e.g. "direct PC"), or other interfaces for coupling a computer system to other computer systems.

The processor 2548 may be, for example, a conventional microprocessor such as an Intel Pentium microprocessor or Motorola power PC microprocessor. The memory 2552 is coupled to the processor 2548 by a bus 2560. The memory 2552 can be dynamic random access memory (DRAM) and can also include static ram (SRAM). The bus 2560 couples the processor 2548 to the memory 2552, also to the non-volatile storage 2556, to the display controller 2554, and to the I/O controller 2558.

The I/O devices 2544 can include a keyboard, disk drives, printers, a scanner, and other input and output devices, including a mouse or other pointing device. The display controller 2554 may control in the conventional manner a display on the display device 2546, which can be, for example, a cathode ray tube (CRT) or liquid crystal display (LCD). The display controller 2554 and the I/O controller 2558 can be implemented with conventional well known technology.

The non-volatile storage 2556 is often a magnetic hard disk, an optical disk, or another form of storage for large amounts of data. Some of this data is often written, by a direct memory access process, into memory 2552 during execution of software in the computer 2542. Objects, methods, inline caches, cache states and other object-oriented components may be stored in the non-volatile storage 2556, or written into memory 2552 during execution of, for example, an object-oriented software program. In this way, the components illustrated in, for example, FIGS. 1-6 can be instantiated on the computer system 2540.

The computer system 2540 is one example of many possible computer systems which have different architectures. For example, personal computers based on an Intel microprocessor often have multiple buses, one of which can be an I/O bus for the peripherals and one that directly connects the processor 2548 and the memory 2552 (often referred to as a memory bus). The buses are connected together through bridge components that perform any necessary translation due to differing bus protocols.

Network computers are another type of computer system. Network computers do not necessarily include a hard disk or other mass storage, and the executable programs are loaded from a network connection into the memory 2552 for execution by the processor 2548. A typical computer system will usually include at least a processor, memory, and a bus coupling the memory to the processor.

In addition, the computer system 2540 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 2556 and causes the processor 2548 to execute the various acts required by the operating system to input and output data and to store data in memory, including storing files on the non-volatile storage 2556.

Figure 26:
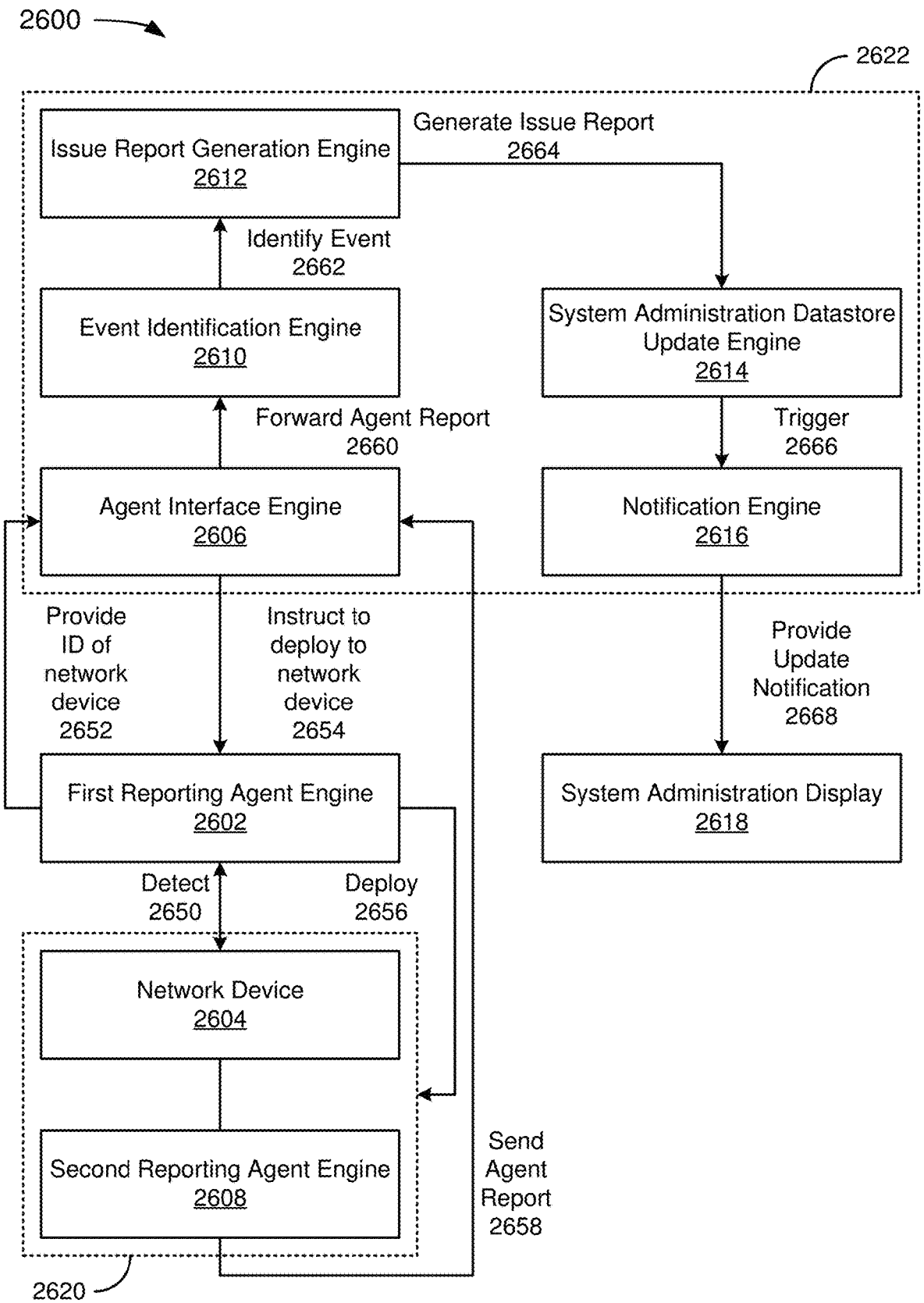
FIG. 26 depicts a diagram of an example of a system for providing network update notifications to a system administration display.

FIG. 26 depicts a diagram 2600 of an example of a system for providing network update notifications to a system administration display. The diagram 2600 includes a first reporting agent engine 2602, a network device 2604, an agent interface engine 2606, a second reporting agent engine 2608, an event identification engine 2610, an issue report generation engine 2612, a system administration datastore update engine 2614, a notification engine 2616, and a system administration display 2618. The diagram 2600 includes a subsystem 2620 that includes the network device 2604 and the second reporting agent engine 2608 and a subsystem 2622 that includes the agent interface engine 2606, the event identification engine 2610, the issue report generation engine 2612, the system administration datastore update engine 2614, and the notification engine 2616.

In the example of FIG. 26, in a specific implementation, a portion of a system administration program is made available for download, provided on a non-transitory memory device, or otherwise made available to a system administrator or agent thereof. At least in part by downloading some of the system administration program to a network device (not shown), a system administrator of a network can implement the first reporting agent engine 2602 on a relevant network.

In the example of FIG. 26, in a specific implementation, the first reporting agent engine indicates to the subsystem 2622 that the first reporting agent engine is operational. The indication can be sent when the first reporting agent engine first comes online, in response to a query from the subsystem 2622, or in some other manner that makes the first reporting agent engine 2602 known to the subsystem 2622. When the first reporting agent engine 2602 is operational, the first reporting agent engine 2602 can be characterized as part of a system administrator agent program.

In the example of FIG. 26, in a specific implementation, the subsystem 2622 is provided with a range of IP addresses that are valid for the network. The list can be provided from the first reporting agent engine 2602, through a web interface (e.g., via a browser into which the data is entered by a system administrator or agent thereof), or in some other known or convenient manner suitable for making the range of IP addresses known to the subsystem 2622.

In the example of FIG. 26, the first reporting agent engine 2602 detects 2650 the network device 2604. The first reporting agent engine 2602 can be implemented as, for example, a system monitoring engine (see, e.g., FIG. 1, system monitoring engine 112-1). Detection can include utilizing an ARP engine (see, e.g., FIG. 1, ARP engine 114). The ARP engine may or may not query a datastore that includes a list of network devices, including an identifier of the network device 2604. SNMP can be used to build the datastore (see, e.g., FIG. 3).

In the example of FIG. 26, the first reporting agent engine 2602 provides 2652 an ID of the network device 2604 to the agent interface engine 2606. In a specific implementation, the ID is in the form of an IP address and MAC address, though the ID could be an IP address alone or a MAC address alone in alternative implementations (though with potentially less advantageous capabilities) or using some other known or convenient identification mechanism (e.g., a proprietary identifier). A key characteristic of the ID is that the ID can be used to unambiguously identify the network device 2604 within the context of an administered network. The first reporting agent 2602 can provide the ID of the network device 2604 in response to a request for unreported IDs, a current list of IDs, a request for a specific ID, or the like. Alternatively, the first reporting agent 2602 can provide the ID of the network device 2604 when the ID first becomes known, as part of a batch of as-of-yet unreported IDs, periodically, or the like. The ID can be provided from the first reporting agent 2602 and other IDs can be provided from other reporting agents (not shown) and/or the reported IDs can be overlapping or perfect sets that together comprise a list of devices on the administered network.

In the example of FIG. 26, the agent interface engine 2606 instructs 2654 the first reporting agent engine 2602 to deploy a portion of the of a system administration agent program to the network device 2604. It may be noted that all detectable devices are not necessarily suitable for implementing an agent of the system administration agent program (other than by, for example, coopting some pre-existing capability, such as SNMP-compliant reporting). Accordingly, the first reporting agent engine 2602, an engine of the subsystem 2622, or some other engine may or may not first determine whether the network device is a suitable target for deployment of a portion of a system administration agent program. Suitability can be defined as, for example, a capability to implement at least a portion of the system administration agent program as a second reporting agent engine. In a specific implementation, the instruction to deploy to the network device 2604 can be part of an instruction to deploy to other network devices (not shown).

In the example of FIG. 26, the first reporting agent engine 2602 deploys 2656 a portion of the system administration agent program to the subsystem 2620. The deployment can be characterized as to the network device 2604 in a typical implementation, though it is possible that the deployment would be to a device that is relatively near (or perhaps even on the same discrete hardware device as) the network device. Accordingly, the subsystem 2620 can be considered to be a subnetwork that includes the network device 2604, a hardware device that includes the network device 2604 and other components, or as the network device 2604 itself. Depending upon the implementation, the second reporting agent engine 2608, which is created by implementing the deployed portion of the system administration agent program, in the subsystem 2620 can be on a nearby device, on the same discrete hardware device as the network device 2604, or treated as part of the network device 2604. It may be noted that the first reporting agent engine 2602 can be treated as three sub-engines, one for detecting the network device 2604 (a "network device detection engine"), one for sending agent reports (a "reporting engine") and one for deploying a portion of the system administration agent program (a "deployment engine").

In the example of FIG. 26, the second reporting agent engine 2608 sends 2658 an agent report to the agent interface engine 2606. In a specific implementation, the first reporting agent engine 2602 can also send reports (not shown, except to the extent providing an ID of the network device was an agent report). It may be noted that the second reporting agent engine 2608 is assumed to include two or more sub-engines, one for monitoring a device or network (a "system monitoring engine") and one for sending agent reports (a "reporting engine"). The second reporting agent engine 2608 can also include a network device detection engine and a deployment engine.

In the example of FIG. 26, the agent interface engine 2606 forwards 2660 the agent report to the event identification engine 2610. The event identification engine 2610 can translate, compile, or pass through as events agent reports. As used in this paper, the event is created from data that is passed from reporting agents. However, it should be understood that the agent reports themselves can be considered "events" as the term is used in computing; i.e., an event is an action handled by a portion of a program usually synchronously with program flow. A computer program that changes its behavior in response to events is said to be event-driven. In a specific implementation, the event identification engine 2610 can access a system administration datastore to create, read, update, or delete data structures in accordance with agent reports and other "events." This can include resolving "events" without further processing or notification, rather than passing the "event" on as an "identified event."

In the example of FIG. 26, the event identification engine 2610 identifies 2662 events for the issue report generation engine 2612. Identified events can be characterized as "actionable events" because the issue report generation engine 2612 will generate issue reports for the events so identified. In a specific implementation, the event identification engine 2610 is capable of analyzing agent reports (or events) and generating an expert event in response to the analysis. Such internal-to-the-program generated events can be treated in much the same way as other events (e.g., an issue report can be generated for the expert event and the system administration datastore can be updated as appropriate).

In the example of FIG. 26, the issue report generation engine 2612 generates 2664 an issue report for the system administration datastore update engine 2614. The system administration datastore update engine 2614 updates the system administration datastore in accordance with issue reports in real-time. By updating in real-time, what is meant is the event lifecycle is responsive to the event to enable a notification to be generated shortly after the event is identified. Not all events need to necessarily be disposed of in real time, but some events, such as events associated with network disruption, intrusion detection, or the like, may be of a character and weight to make real-time responsiveness desirable.

In the example of FIG. 26, the system administration datastore update engine 2614 triggers 2666 the notification engine 2616 to provide an update notification 2668 to the system administration display 2618. In this way, a system administrator for an administered network can received up-to-the-second updates for the network. The system administration display 2618 can include a browser implemented on a computing device that is remote relative to the subsystems 2620 and 2622.

What is claimed is:

1. A method comprising:
   receiving an indication that a system administration agent program is installed on a first device on a network;
   receiving a range of Internet protocol (IP) addresses that are valid for the network;
   requesting a list of devices on the network from the first device;
   receiving the list of devices on the network from the first device;
   instructing the first device to deploy at least a portion of the system administration agent program to suitable devices on the network;
   receiving agent reports from reporting agents associated with the system administration agent program;
   identifying events from the agent reports;
   generating issue reports for a subset of the events;
   updating a system administration datastore in real-time based on the issue reports, wherein the updating results in real-time updates;
   sending a notification of an update for a subset of the real-time updates to a user, wherein one or more parameters of the notification are set by the user;
   performing one or more actions on one or more of the devices on the network, wherein if the user is not on the network, the one or more actions are automatically performed by the system administration agent program based on the one or more parameters of the notification set by the user.

2. The method of claim 1, comprising making at least a portion of the system administration agent program available for download.

3. The method of claim 1, comprising generating the agent reports upon receiving a request from the user.

4. The method of claim 1, wherein receiving the range of IP addresses that are valid for the network occurs before, during, or after a registration procedure in which information associated with the network is provided to a system administration server.

5. The method of claim 4, wherein access to the system administration server is password-protected, and the registration procedure includes generating or obtaining a user ID and a password for the user.

6. The method of claim 4, wherein the registration procedure includes collecting financial information.

7. The method of claim 1, wherein requesting the list of devices on the network from the first device comprises querying an address resolution protocol (ARP) engine.

8. The method of claim 1, wherein the agent reports include information about one or more of neighboring devices, peripheral devices, and a network environment of the devices on the network.

9. A system comprising:
   a memory storing a program communicating with one or more processors that execute the program to perform:
      receiving an indication that a system administration agent program is installed on a first device on a network;
      receiving a range of IP addresses that are valid for the network;
      requesting a list of devices on the network from the first device;
      receiving the list of devices on the network from the first device;
      instructing the first device to deploy at least a portion of the system administration agent program to suitable devices on the network;
      receiving agent reports from reporting agents associated with the system administration agent program;
      identifying events from the agent reports;
      generating issue reports for a subset of the events;
      updating a system administration datastore in real-time based on the issue reports, wherein the updating results in real-time updates;
      sending a notification of an update for a subset of the real-time updates to a user, wherein one or more parameters of the notification are set by the user;
      performing one or more actions on one or more of the devices on the network, wherein if the user is not on the network, the one or more actions are automatically performed by the system administration agent program based on the one or more parameters of the notification set by the user.

10. The system of claim 9, wherein the one or more processors execute the program to perform making at least a portion of the system administration agent program available for download.

11. The system of claim 9, wherein the one or more processors execute the program to perform generating the agent reports upon receiving a request from the user.

12. The system of claim 9, wherein receiving the range of IP addresses that are valid for the network occurs before, during, or after a registration procedure in which information associated with the network is provided to a system administration server.

13. The system of claim 12, wherein access to the system administration server is password-protected, and the registration procedure includes generating or obtaining a user ID and a password for the user.

14. The system of claim 12, wherein the registration procedure includes collecting financial information.

15. The system of claim 9, wherein requesting the list of devices on the network from the first device comprises querying an address resolution protocol (ARP) engine.

16. The system of claim 9, wherein the agent reports include information about one or more of neighboring devices, peripheral devices, and a network environment of the devices on the network.

17. The method of claim 1, wherein the one or more actions comprise one or more of locking a device, encrypting contents of a device, downloading contents of a device, and tracking a location of a device.

18. The system of claim 9, wherein the one or more actions comprise one or more of locking a device, encrypting contents of a device, downloading contents of a device, and tracking a location of a device.

* * * * *